(12) United States Patent
Okawa et al.

(10) Patent No.: US 12,329,124 B2
(45) Date of Patent: Jun. 17, 2025

(54) ANIMAL TOILET

(71) Applicant: UNICHARM CORPORATION, Ehime (JP)

(72) Inventors: Ayano Okawa, Kanonji (JP); Yasuhiro Sasano, Kanonji (JP); Misato Nakatani, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 181 days.

(21) Appl. No.: 17/979,373

(22) Filed: Nov. 2, 2022

(65) Prior Publication Data

US 2023/0051699 A1 Feb. 16, 2023

Related U.S. Application Data

(63) Continuation of application No. PCT/JP2021/018953, filed on May 19, 2021.

(30) Foreign Application Priority Data

Jun. 4, 2020 (JP) .................................. 2020-097403

(51) Int. Cl.
*A01K 1/01* (2006.01)
(52) U.S. Cl.
CPC .................................... *A01K 1/011* (2013.01)
(58) Field of Classification Search
CPC ................................................. A01K 1/0114
See application file for complete search history.

(56) References Cited

U.S. PATENT DOCUMENTS

| 5,044,325 A | | 9/1991 | Miksitz | |
| 5,140,948 A | * | 8/1992 | Roberts | A01K 1/0107 119/500 |
| 5,315,964 A | * | 5/1994 | Mimms | A01K 1/0052 119/500 |
| 5,511,513 A | | 4/1996 | Baron et al. | |
| 5,564,364 A | * | 10/1996 | Kovacs | A01K 1/0107 119/165 |

(Continued)

FOREIGN PATENT DOCUMENTS

| CN | 103180887 A | 6/2013 |
| CN | 107249314 A | 10/2017 |

(Continued)

OTHER PUBLICATIONS

Merged translation of EP_1062868 (Year: 2000).*

(Continued)

*Primary Examiner* — Morgan T Jordan
(74) *Attorney, Agent, or Firm* — Osha Bergman Watanabe & Burton LLP

(57) ABSTRACT

An animal litter box includes an upper container, a tray, a lower container, and a ventilation fan. The upper container includes a liquid passage portion having holes through which urine passes downward. An absorbent body is disposed on the tray to absorb the urine that passes through the liquid passage portion. The lower container supports the upper container from below and detachably accommodates the tray. The ventilation fan is disposed in the lower container and sends internal air in the lower container to an outside.

9 Claims, 14 Drawing Sheets

(56) References Cited

U.S. PATENT DOCUMENTS

| | | | | |
|---|---|---|---|---|
| 5,738,040 | A * | 4/1998 | Simmons | A01K 1/0047 119/500 |
| 5,778,822 | A * | 7/1998 | Giffin | A01K 1/0047 119/500 |
| 5,988,108 | A * | 11/1999 | Silver | A01K 1/0052 119/166 |
| 6,341,579 | B1 * | 1/2002 | Alkire | A01K 1/0107 119/493 |
| 9,565,830 | B1 * | 2/2017 | Caico | A01K 1/0107 |
| 9,750,225 | B1 * | 9/2017 | Makins | A01K 1/0107 |
| 2002/0069830 | A1 * | 6/2002 | Clemmons | A01K 1/035 119/165 |
| 2002/0127966 | A1 * | 9/2002 | Rich | A01K 1/0107 454/341 |
| 2004/0261727 | A1 * | 12/2004 | Matsuo | A01K 1/0107 119/170 |
| 2006/0156993 | A1 * | 7/2006 | Wright | A01K 1/033 119/165 |
| 2006/0201437 | A1 * | 9/2006 | Ryan | A01K 1/033 119/165 |
| 2007/0215057 | A1 * | 9/2007 | Geer | A01K 1/0107 119/165 |
| 2007/0289542 | A1 * | 12/2007 | Wright | A01K 1/0047 119/165 |
| 2009/0000558 | A1 * | 1/2009 | Matsuo | A01K 1/0114 119/165 |
| 2010/0132624 | A1 * | 6/2010 | Ferrer | A01K 1/035 119/500 |
| 2012/0204800 | A1 * | 8/2012 | Beaudoin | A01K 1/0152 119/166 |
| 2013/0247830 | A1 * | 9/2013 | Bell | A01K 1/0107 119/166 |
| 2017/0347618 | A1 * | 12/2017 | Spadola | A01K 1/0052 |
| 2020/0060221 | A1 * | 2/2020 | Fan | A01K 1/0114 |
| 2023/0380377 | A1 * | 11/2023 | Chambers | A01K 1/0107 |
| 2023/0404023 | A1 * | 12/2023 | Kirkpatrick | A01K 1/0107 |

FOREIGN PATENT DOCUMENTS

| | | | |
|---|---|---|---|
| CN | 206866300 U | 1/2018 | |
| EP | 1062868 A1 * | 12/2000 | ............ A01K 1/011 |
| JP | H01105450 U | 7/1989 | |
| JP | H05022063 Y2 | 6/1993 | |
| JP | H06-075151 U | 10/1994 | |
| JP | 2605781 Y2 | 8/2000 | |
| JP | 2006296288 A | 11/2006 | |
| JP | 2009011181 A | 1/2009 | |
| JP | 2014166174 A | 9/2014 | |
| JP | 2020068724 A | 5/2020 | |
| KR | 20020012085 A | 2/2002 | |
| WO | WO-9414315 A1 * | 7/1994 | ........... A01K 1/0107 |
| WO | WO-2018159995 A1 * | 9/2018 | ............... A01K 1/00 |
| WO | 2020076268 A2 | 4/2020 | |
| WO | 2020/090065 A1 | 5/2020 | |

OTHER PUBLICATIONS

Merged translation of WO_2018159995 (Year: 2018).*
International Search Report issued in corresponding International Application No. PCT/JP2021/018953, mailed Aug. 10, 2021, with translation (7 pages).
International Preliminary Report on Patentability issued in corresponding International Application No. PCT/JP2021/018953, mailed Dec. 6, 2022 (5 pages).
Notice of Reasons for Refusal issued in Japanese Application No. 2020-097403 mailed Jan. 24, 2023 (9 pages).
Extended European Search Report issued in corresponding European Patent Application No. 21818706.0, dated Jul. 18, 2023, 41 pages.
Office Action issued in corresponding Chinese Patent Application No. 202180039484.9, dated Jan. 22, 2025, with translation (23 pages).
Office Action issued in corresponding Chinese Patent Application No. 202180039484.9, dated Sep. 25, 2024, with translation (15 pages).
Final Office Action issued in corresponding Chinese Patent Application No. 202180039484.9, mailed Mar. 28, 2025 (10 pages).

* cited by examiner

ANIMAL TOILET

BACKGROUND

Field

The present invention relates to an animal litter box.

Description of the Related Art

Animal litter boxes for use by animals who are kept indoors such as cats is conventionally known. For example, Patent Literature 1 discloses an animal litter box including: an upper container including a bottom portion (liquid passage portion) having a plurality of holes through which allows urine excreted by an animal to pass through; a holding portion for disposing an absorbing sheet (absorbent body) which absorbs urine passing through the bottom portion; and a lower container that is positioned below the bottom portion and accommodates the holding portion while supporting the upper container.

PATENT LITERATURE

Patent Literature 1: Japanese Patent Application Publication No. 2009-011181

In such an animal litter box, urine odor due to urine absorbed by the absorbing sheet is more likely to be generated in the lower part, and fecal odor due to feces that has not passed through the liquid passage portion is more likely to be generated in the upper part. Such unpleasant odor caused by urine or feces is more likely to spread from an opening portion positioned in the upper part, and there is a risk of causing discomfort to the owner or the like. Further, the unpleasant odor is more likely to be accumulated inside the litter box, and for example, the unpleasant odor diffuses at the time of replacing the absorbing sheet.

SUMMARY

One or more embodiments provide an animal litter box capable of efficiently removing an unpleasant odor such as urine odor and fecal odor.

An animal litter box having a front-back direction, a lateral direction, and a vertical direction that intersect one another, the animal litter box including: an upper container including a liquid passage portion that has a plurality of holes through which urine pass downward; a tray on which an absorbent body for absorbing the urine that has passed through the liquid passage portion is placed; a lower container that supports the upper container from below and that detachably accommodates the tray;

and a ventilation fan that sends internal air to an outside and that is provided in the lower container.

Features of one or more embodiments other than the above will become clear by reading the description of the present specification with reference to the accompanying drawings.

According to one or more embodiments, it is possible to provide an animal litter box capable of efficiently removing an unpleasant odor such as urine odor and fecal odor.

DETAILED DESCRIPTION OF THE EMBODIMENTS

Figure 1A:
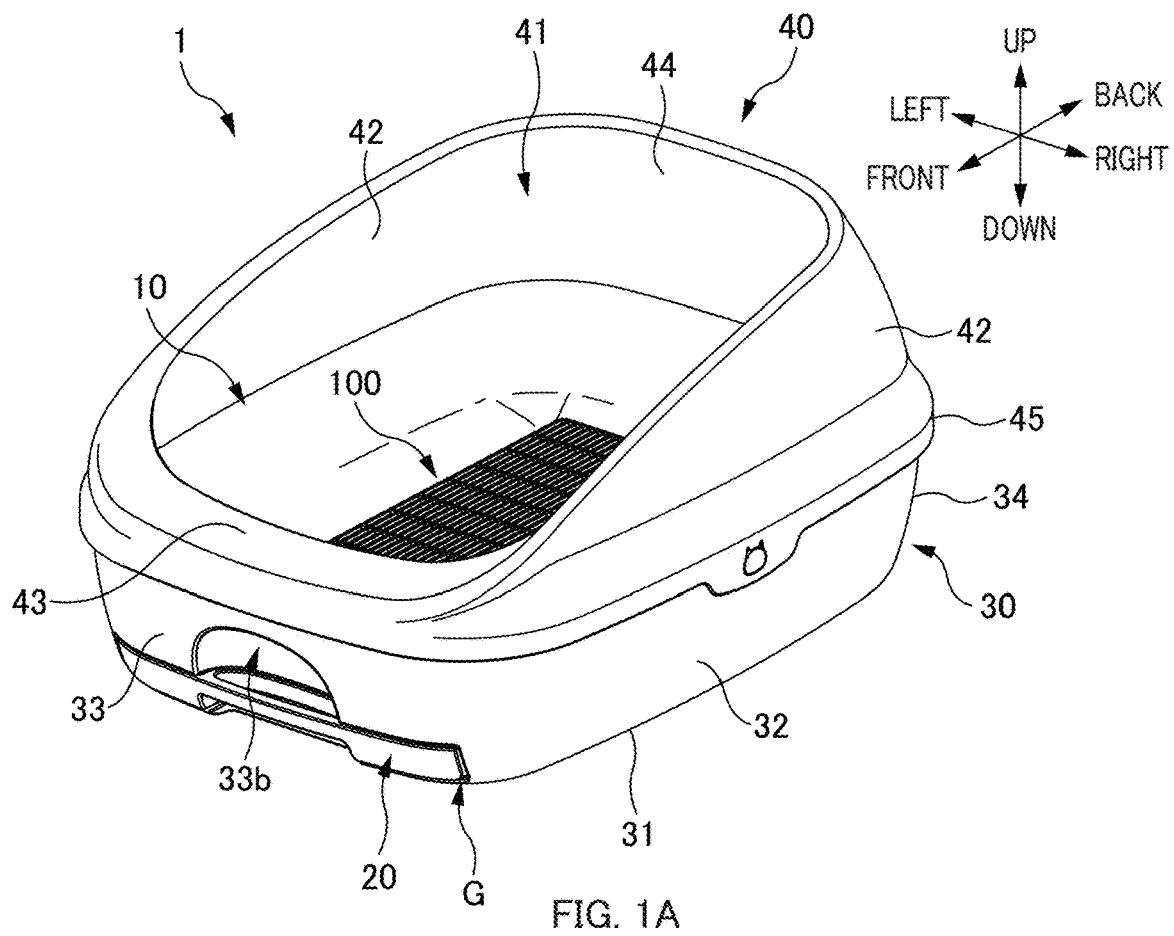
FIG. 1A is a schematic perspective view of an animal litter box according to one or more embodiments when viewed from the front side.

At least following matters will become clear with description of this specification and attached drawings.

An animal litter box having a front-back direction, a lateral direction, and a vertical direction that intersect one another, the animal litter box including: an upper container including a liquid passage portion that has a plurality of holes through which urine pass downward; a tray on which an absorbent body for absorbing the urine that has passed through the liquid passage portion is placed; a lower container that supports the upper container from below and that detachably accommodates the tray; and a ventilation fan that sends internal air to an outside and that is provided in the lower container.

According to the above-described animal litter box, since the ventilation fan is provided in the lower container, a urine odor caused by urine absorbed by the absorbent body and a fecal odor caused by feces remaining in the liquid passage portion can be prevented from coming up and can be sucked downward. Accordingly, it is possible to efficiently remove the air (unpleasant odor) of the litter box.

In such an animal litter box, it is desirable that at least a part of the ventilation fan is positioned below a lower surface of the liquid passage portion of the upper container.

According to the above-described animal litter box, it makes the unpleasant odor likely to be suck downward through the liquid passage portion.

In such an animal litter box, it is desirable that the ventilation fan is capable of rotating around a predetermined rotation shaft, and that the rotation shaft is positioned below a lower surface of the liquid passage portion of the upper container.

According to the above-described animal litter box, it makes the unpleasant odor more likely to be suck downward.

In such an animal litter box, it is desirable that the ventilation fan is provided on a side surface of the lower container that is not located in a front side of the lower container, and that the rotation shaft extends along an oblique direction that rises upward in the vertical direction as it goes inward from an outward side along the rotation shaft.

According to the above-described animal litter box, by obliquely arranging the ventilation fan, it is possible to enhance the ventilation efficiency.

In such an animal litter box, it is desirable that the ventilation fan is provided on a side surface of the lower container located on a back side, and that the rotation shaft extends along an oblique direction that rises upward in the vertical direction as it goes forward in the front-back direction.

According to the above-described animal litter box, by obliquely arranging the ventilation fan, it is possible to enhance the ventilation efficiency. In addition, the unpleasant odor of the liquid passage portion can be more likely to sucked, and further, the urine attached to the liquid passage portion can be likely to dropped onto the absorbent body of the tray.

In such an animal litter box, it is desirable that a side surface of the lower container located on a back side is inclined with respect to the vertical direction.

According to the above-described animal litter box, since the ventilation fan is provided in the portion inclined with respect to the vertical direction, the ventilation fan can be obliquely arranged, and the rotation shaft of the ventilation fan can extend along the oblique direction.

In such an animal litter box, it is desirable that the ventilation fan is provided on a side surface of the lower container that is not located a front side of the lower container, that an attach/detach opening portion for attaching and detaching the tray is provided on a front surface of the lower container, and that in a state where the tray is accommodated in the lower container, a gap is formed between the tray and an edge of the attach/detach opening portion of the lower container.

According to the above-described animal litter box, it makes air likely to flow from the front side of the lower container to the ventilation fan. Therefore, the air flow can be enhanced.

In such an animal litter box, it is desirable that an opening portion is provided in a bottom portion of the lower container, and that an uneven portion is formed on a lower surface of the bottom portion.

According to the above-described animal litter box, the air flow can be enhanced by the opening portion and the unevenness of the bottom portion of the lower container, making it possible to enhance the ventilation efficiency.

In such an animal litter box, it is desirable that the animal litter box further comprises a deodorization filter on an inner side or an outer side with respect to the ventilation fan, a deodorant being used for the deodorization filter.

According to the above-described animal litter box, the deodorization filter can adsorb an unpleasant odor component, and the unpleasant odor can be prevented from diffusing to the outside (living space) of the litter box.

In such an animal litter box, it is desirable that the animal litter box further comprises a litter-preventing filter on an inner side with respect to the deodorization filter and the ventilation fan, the litter-preventing filter being coarser than the deodorization filter.

According to the above-described animal litter box, it is possible to prevent clogging of the deodorization filter due to the cat litter powder or the like arranged on the liquid passage portion, and also to prevent rotation failure of the ventilation fan.

In such an animal litter box, it is desirable that the animal litter box further comprises a water-repellent filter on an inner side with respect to the deodorization filter and the ventilation fan, the water-repellent filter having water repellency.

According to the above-described animal litter box, it is possible to repel scattered urine or the like.

In such an animal litter box, it is desirable that the ventilation fan is detachably provided in the lower container.

According to the above-described animal litter box, the lower container can be easily washed, making maintenance easier.

First Example

The animal litter box according to one or more embodiments is used by animals who are kept indoors such as cats, for example. The "animals" in the present specification include not only commonly known pets such as cats, dogs, rabbits, hamsters, and the like but also young offspring of a tigers or lions and the like.

Overall Configuration

Figure 1B:
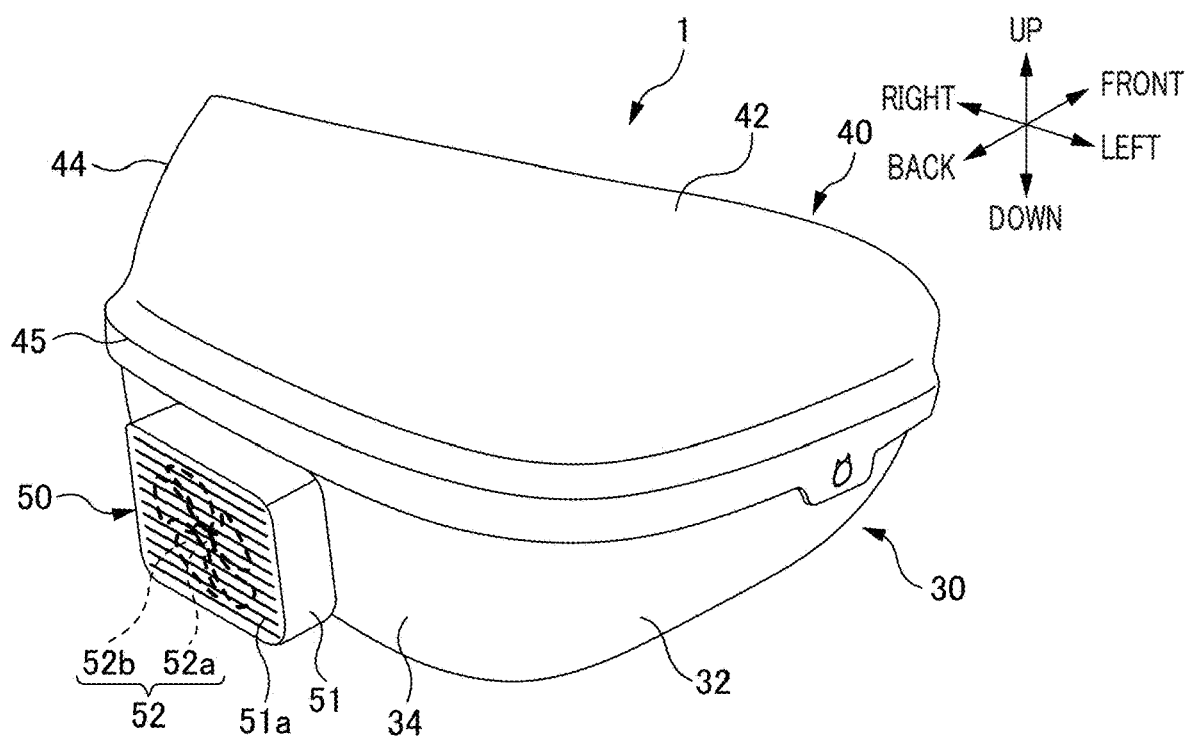
FIG. 1B is a schematic perspective view of an animal litter box according to one or more embodiments when viewed from the back side.
Figure 2:
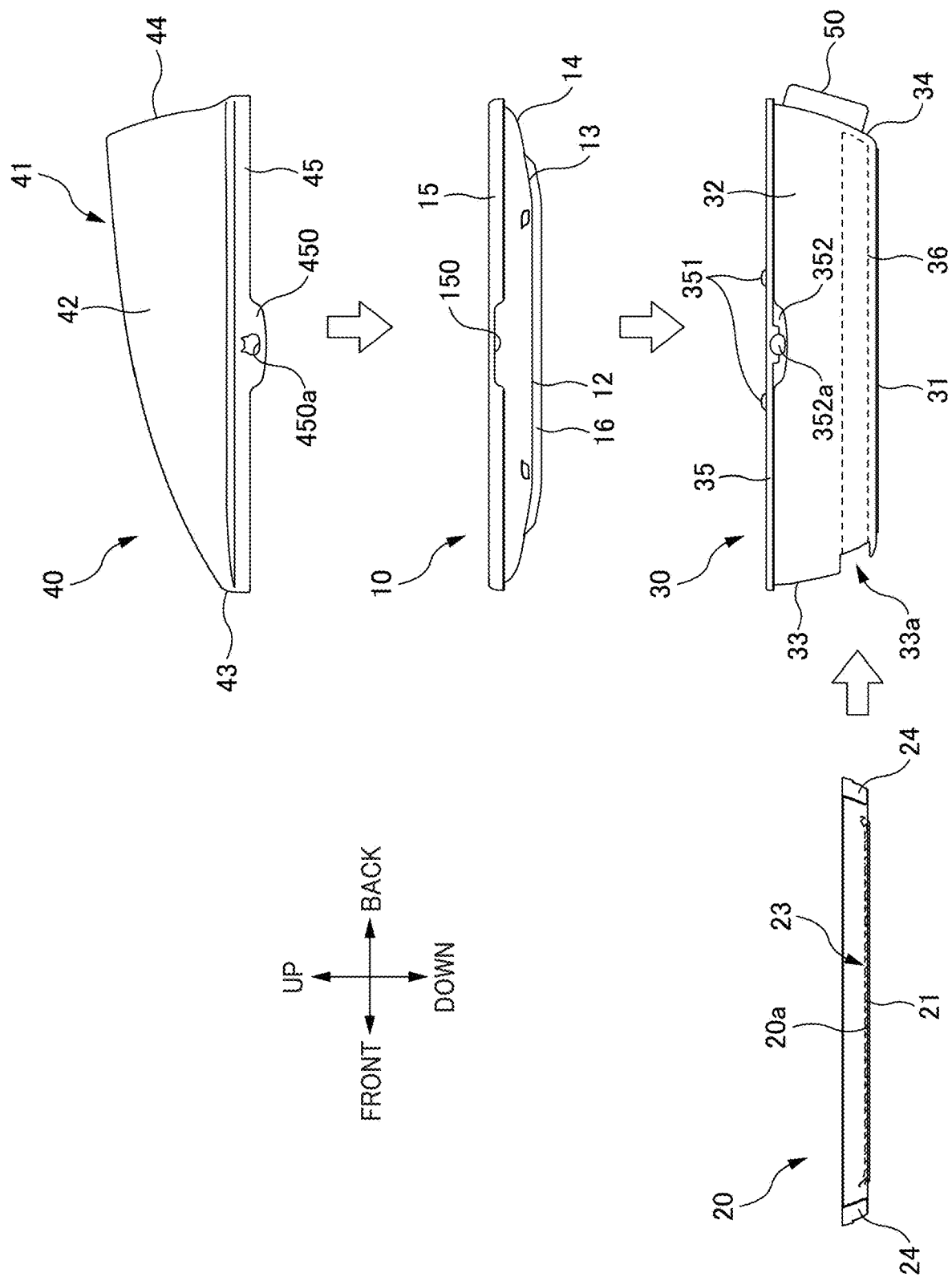
FIG. 2 is an exploded side view of the animal litter box according to one or more embodiments.

FIGS. 1A and 1B are schematic perspective views of an animal litter box 1 according to one or more embodiments. FIG. 1A is a perspective view when viewed from the front side, and FIG. 1B is a perspective view when viewed from the back side. FIG. 2 is an exploded side view of the animal litter box 1. In addition, in the description below, three directions that are orthogonal to (intersect) one another, namely a "front-back direction", a "lateral direction", and a "vertical direction" are defined as shown in FIGS. 1A and 1B. The front-back direction is a direction extending along the longitudinal direction of the animal litter box 1, the side from which a tray 20 is pull out from a lower container 30 is defined as the "front" side, and the opposite side is defined as the "back" side. The lateral direction is a direction extending along the width direction of the animal litter box 1, the right side when the animal litter box 1 is viewed from the front side is defined as "right", and the opposite side (left side) is defined as "left". The vertical direction is a direction extending along the up-down direction, the upper side in the up-down direction is defined as "up", and the lower side in the up-down direction is defined as "down".

The animal litter box 1 includes an upper container 10, a lower container 30, a tray 20 which is accommodated in the lower container 30, and a cover 40. It should be noted that each of the upper container 10, the tray 20, the lower container 30, and the cover 40 is formed of polyolefin-based thermoplastic resin, such as polyethylene (PE), polypropylene (PP), polyethylene terephthalate (PET), or the like. However, the material for constituting the members is not limited thereto. For example, other resins, metal plates such as stainless steel plates, aluminum plates and the like may be used. Further, as shown in FIG. 1B, in the animal litter box 1 of one or more embodiments, a ventilator 50 is provided in the lower container 30.

As shown in FIG. 2, the upper container 10, the tray 20, the lower container 30, and the cover 40 can be freely attached to and detached from each other. Specifically, the lower container 30 is placed being stacked below and attached to the upper container 10. The lower container 30 detachably accommodates the tray 20 in which an absorbent body 20a that absorbs excreted urine and the like can be placed. The cover 40 is attached to the upper portion of the upper container 10. Since the members can be detached from each other in this manner, this makes easier to clean. It should be noted that the ventilator 50 may be fixed to the lower container 30, but it is desirable that the ventilator 50 is detachably disposed of the lower container 30. Making a configuration detachable makes it possible to detach the ventilator 50 including a precision device (a later-described fan 52), from the lower container 30 during the cleaning and the like. Accordingly, the lower container 30 can be easily washed, making maintenance easier.

Configuration of Upper Container 10

Figures 3A, 3B:
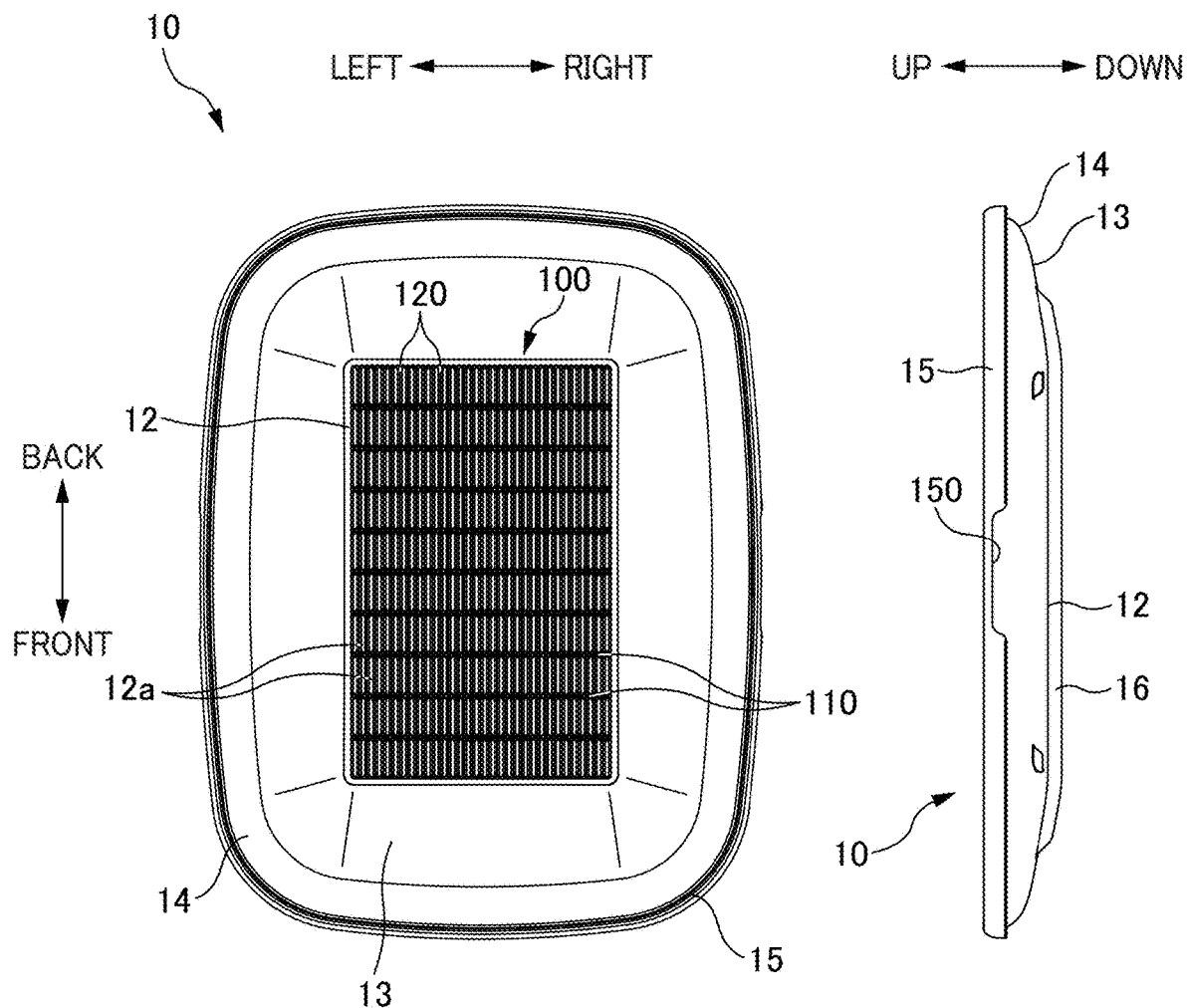
FIG. 3A is a top view of an upper container according to one or more embodiments.
FIG. 3B is a right side view of the upper container according to one or more embodiments.
Figure 3C:
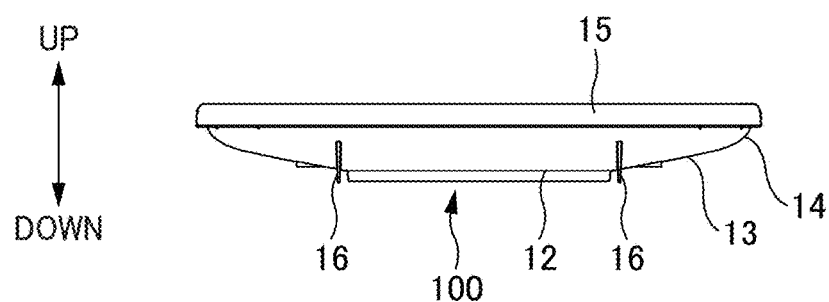
FIG. 3C is a front view of the upper container according to one or more embodiments.

FIG. 3A is a top view of the upper container 10. FIG. 3B is a right side view of the upper container 10. FIG. 3C is a front view of the upper container 10. The upper container 10 is a substantially box-shaped member having an open upper side, and an animal such as a cat performs excretion on the upper surface of the upper container 10. The upper container 10 of one or more embodiments includes: a bottom portion 12 on which a urine passage portion 100 (corresponding to the liquid passage portion) is provided; an outer peripheral portion 13; a side portion 14; and a folded-back portion 15.

The bottom portion 12 is a portion that constitutes the bottom surface of the upper container 10, and is positioned at the lowest position in the upper container 10 in the vertical direction. On the bottom portion 12, there is provided the urine passage portion 100 that allows urine or the like excreted by an animal to pass through from above to below in the vertical direction. The urine passage portion 100 has a plurality of holes 12a that penetrate in the vertical direction and allow urine to pass through downward, and the excreted urine passes through the holes 12a and moves from above to below in the upper container 10.

As shown in FIG. 3A, in the urine passage portion 100, a plurality of cross ribs 110 extending along the lateral direction are provided and arranged side by side in the front-back direction, and a plurality of longitudinal ribs 120 extending along the front-back direction are provided and arranged side by side in the lateral direction. The urine passage portion 100 is formed in a grid shape by the plurality of cross ribs 110 and the plurality of longitudinal ribs 120. The holes 12a are formed by being surrounded by the cross ribs 110 and the longitudinal ribs 120. In one or more embodiments, the urine passage portion 100 is provided over the entirety of the bottom portion 12. However, for example, the urine passage portion 100 may be provided on a part of the bottom portion 12, or the urine passage portion 100 may be provided from the bottom portion 12 to the outer peripheral portion 13 side.

When the animal litter box 1 is to be used, granules such as cat litter is disposed on the upper surface of the urine passage portion 100, and an animal such as a cat performs excretion on the granules. In one or more embodiments, an excrement treating material (hereinafter, referred to as an excrement treating material S) is placed as granule (see FIG. 7). The excrement treating material S is, for example, a granular substance having a porous structure, such as zeolite or silica gel, or a grain mainly formed of wood or paper having water repellency. The excrement treating material exhibits effects of moisture removal and deodorization by absorbing an ammonia component upon contact with urine excreted by an animal. Further, by placing the granular excrement treating material S in the urine passage portion 100, it makes an animal more likely to recognize that the place (urine passage portion 100) is a location to excretion. In order to suppress the case where granules of the excrement treating material S fall through the holes 12a of the urine passage portion 100 (bottom portion 12), it is desirable that the holes 12a have a shape and size that allows urine to pass but does not allow the excrement treating material S to pass. In one or more embodiments, each hole 12a has a slit shape elongated in the front-back direction as shown in FIG. 3A. However, the shape of the hole 12a is not limited to the slit shape, and may be a circular shape or elliptical shape, for example. Further, through in one or more embodiments, the cross ribs 110 extend along the lateral direction, and the longitudinal ribs 120 extend along the front-back direction, the configuration is not limited thereto. A configuration is acceptable in which the cross ribs 110 and the longitudinal ribs 120 are orthogonal to the vertical direction, and the cross ribs 110 and the longitudinal ribs 120 intersect each other. It should be noted that the specific configuration example of the urine passage portion 100 (the cross ribs 110 and the longitudinal ribs 120) will be described later.

The outer peripheral portion 13 is provided continuing from the bottom portion 12, and in one or more embodiments, the outer peripheral portion 13 is provided continuing so as to be inclined upward from the peripheral edge of the urine passage portion 100. As shown in FIGS. 3B and 3C, on the back side of the outer peripheral portion 13, a plate member 16 extending along the longitudinal rib 120 is provided on each of two lateral sides of the plurality of longitudinal ribs 120 (urine passage portion 100). As shown in FIG. 3C, the pair of plate members 16 protrude downward and has a function as legs when the upper container 10 is placed on the floor, for example.

The side portion 14 is a surface that stands upward from the peripheral edge of the outer peripheral portion 13 and has a larger inclination than the outer peripheral portion 13.

The folded-back portion 15 is a portion formed by folding back the upper end of the side portion 14 downward. As shown in FIGS. 2 and 3B, notches 150 are formed at positions of the folded-back portion 15 facing each other in the lateral direction. The notches 150 is portions which an owner and the like can put on with their fingers for attaching the upper container 10 to the lower container 30 or for detaching the upper container 10 from the lower container 30. It should be noted that only one notch 150 of the two notches 150 is shown in FIGS. 2 and 3B.

Configuration Example of Urine Passage Portion 100

Figure 4A:
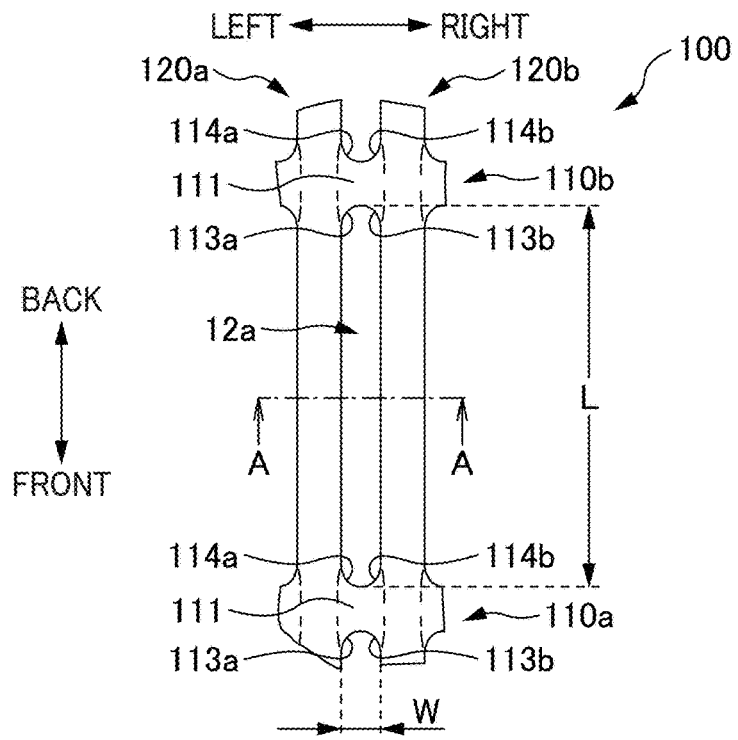
FIG. 4A is an enlarged view of a part of a urine passage portion according to one or more embodiments in FIG. 3A.
Figure 4B:
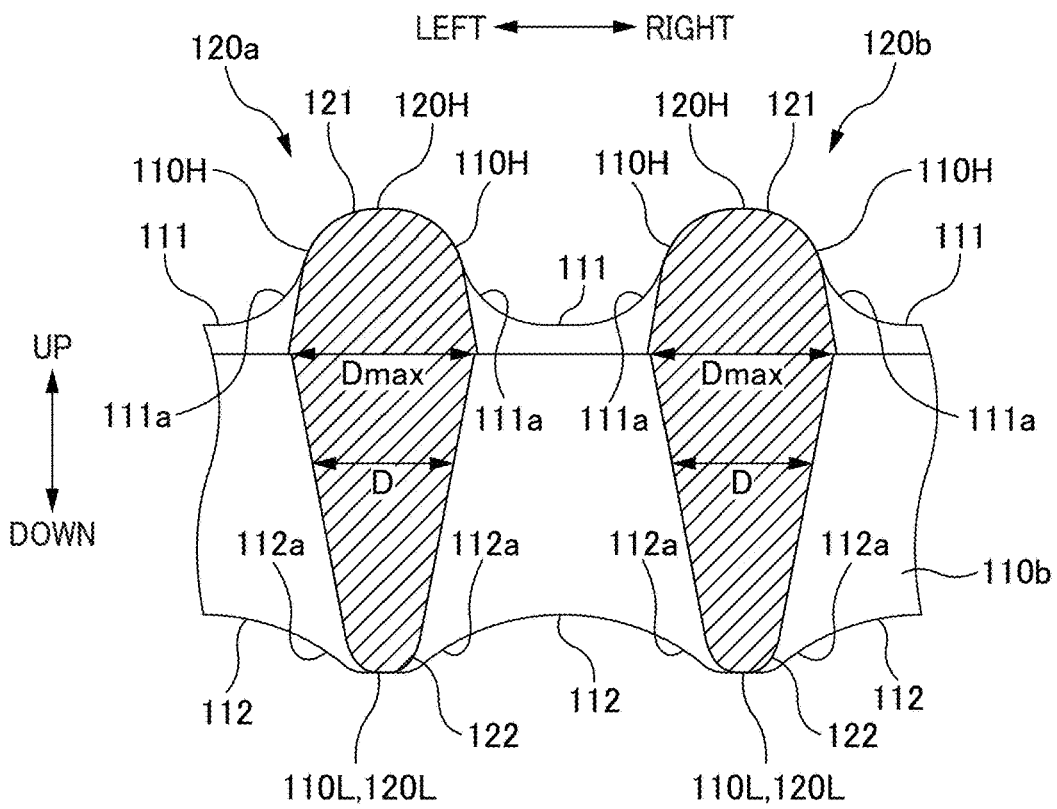
FIG. 4B is a cross-sectional view taken along the line A-A in FIG. 4A.

FIG. 4A is an enlarged view of a part of the urine passage portion 100 in FIG. 3A, and FIG. 4B is a cross-sectional view taken along the line A-A in FIG. 4A.

It should be noted that, in the following description, among the two cross ribs 110 that are adjacent to each other, the cross rib 110 positioned on the front side is referred to as a "front cross rib 110a", and the cross rib 110 positioned on the back side is referred to as a "back cross rib 110b".

Further, among the two longitudinal ribs 120 that are adjacent to each other, the longitudinal rib 120 positioned on the left side is referred to as a "left longitudinal rib 120a", and the longitudinal rib 120 positioned on the right side is referred to as a "right longitudinal rib 120b". Further, in one or more embodiments, the cross ribs 110 and the longitudinal ribs 120 are formed as a single unit, but this is not essential. The cross ribs 110 and the longitudinal ribs 120 may be shaped as separate components and joined.

As shown in FIGS. 4A and 4B, the cross rib 110 connects the plurality of longitudinal ribs 120 located being spaced in the lateral direction. On the upper side of the portion of the cross rib 110 that is connected to the longitudinal rib 120, there is provided an upper inclined surface 111a that is inclined obliquely downward from the longitudinal rib 120.

In one or more embodiments, in the upper portion of the cross rib 110, a first upper curved surface 111 that is curved downward is provided across between the two longitudinal ribs 120 adjacent to one another. A part of the first upper curved surface 111 is the upper inclined surface 111a. It should be noted that the first upper curved surface 111 and the upper inclined surface 111a are not necessarily provided in the upper portion of the cross rib 110.

Further, the uppermost portions 110H of the cross ribs 110 are positioned below the uppermost portions 120H of the longitudinal ribs 120. In other words, the uppermost portions 120H of the longitudinal ribs 120 are provided at positions higher than the uppermost portions 110H of the cross ribs 110. Here, the uppermost portion 110H of the cross rib 110 corresponds to a portion corresponding to the boundary with the longitudinal rib 120 in the upper inclined surface 111a, and the uppermost portion 120H of the longitudinal rib 120 corresponds to a portion that farthest protrudes upward.

As shown in FIG. 4A, in one or more embodiments, the distance L between the two cross ribs 110 that are adjacent to each other (the front cross rib 110a and the back cross rib 110b) is longer than the distance W between the two longitudinal ribs 120 that are adjacent to each other (the left longitudinal rib 120a and the right longitudinal rib 120b) (L>W). Therefore, the hole 12a whose outer periphery is surrounded with the cross ribs 110a and 110b and the longitudinal ribs 120a and 120b has an elongated shape extending along the longitudinal rib 120, that is, along the front-back direction. Accordingly, at the time of cleaning the upper container 10, by brushing along the longitudinal direction of the hole 12a (the front-back direction of the animal litter box 1) or the like, it makes cleaning easier. Further, air is likely to flow toward the later-described ventilator 50 (fan 52).

Further, at the time of cleaning the animal litter box 1, brushing or the like is often performed in the front-back direction. At this time, as described above, since the cross ribs 110 arranged along the direction intersecting the longitudinal ribs 120 (lateral direction) does not protrude upward above the longitudinal ribs 120, it is possible to suppress a case where a brush or the like is caught by the cross ribs 110, facilitating brushing and consequently the cleaning.

Further, the cross ribs 110 are provided with the upper inclined surfaces 111a on the upper side of the portions that are connected to the longitudinal ribs 120, and therefore the angle of the portion where the cross rib 110 is connected to the longitudinal rib 120, to the vertical plane is obtuse. Accordingly, compared with the case where the angle of the portion where the cross rib 110 is connected to the longitudinal rib 120 is orthogonal or acute, dirt such as urine is less likely to be accumulated on the connecting portion (the boundary portion between the cross rib 110 and the longitudinal rib 120). Also, brushing or the like is easily performed, consequently facilitating cleaning. It should be noted that the "vertical plane" refers to a surface constituted by the vertical direction and the lateral direction.

Further, in one or more embodiments, since the first upper curved surface 111 including the upper inclined surface 111a is provided on the upper side of the cross rib 110, the entirety of the upper portion of the cross rib 110 becomes a smooth surface. Thus, dirt such as urine is further less likely to be accumulated, and the brushing and the like can be performed over the entire first upper curved surface 111, consequently further facilitating cleaning.

Similarly, as shown in FIG. 4B, on the lower side of the portion of the cross rib 110 that is connected to the longitudinal rib 120, there is provided a lower inclined surface 112a that is inclined obliquely upward from the longitudinal rib 120. Accordingly, the angle of the portion where the cross rib 110 is connected to the longitudinal rib 120 is obtuse also on the back side of the bottom portion 12. Therefore, compared with the case where the angle of the portion where the cross rib 110 is connected to the longitudinal rib 120 is orthogonal or acute, dirt such as urine is less likely to be accumulated on the connecting portion (the boundary portion between the cross rib 110 and the longitudinal rib 120). Also, brushing or the like is easily performed, consequently facilitating cleaning.

In one or more embodiments, in the lower portion of the cross rib 110, a first lower curved surface 112 that is curved upward is provided across between the two longitudinal ribs 120 adjacent to one another. A part of the first lower curved surface 112 is the lower inclined surface 112a.

Accordingly, since the entirety of the lower portion of the cross rib 110 becomes a smooth surface, dirt such as urine is further less likely to be accumulated (urine easily flows), and brushing or the like can be performed over the entire first lower curved surface 112, consequently further facilitating cleaning also on the back side (lower side). It should be noted that the first lower curved surface 112 and the lower inclined surface 112a are not necessarily provided on the lower side of the cross rib 110.

As shown in FIG. 4A, when the cross rib 110 and the longitudinal rib 120 are viewed along the vertical direction, in the portion of the cross rib 110 that is connected to the longitudinal rib 120, there are provided front curved surfaces 113a and 113b and back curved surfaces 114a and 114b which are curved toward the longitudinal rib 120.

In one or more embodiments, as shown in FIG. 4A, the front curved surface 113a that is curved toward the left longitudinal rib 120a and the front curved surface 113b that is curved toward the right longitudinal rib 120b are continuously formed, and therefore an arc surface is formed extending from the left longitudinal rib 120a to the right longitudinal rib 120b, on the front side of the cross rib 110. Similarly, on the back side of the cross rib 110, an arc surface is formed by the back curved surface 114a that is curved toward the left longitudinal rib 120a and the back curved surface 114b that is curved toward the right longitudinal rib 120b.

Therefore, the hole 12a whose outer periphery is surrounded by the front cross rib 110a, the back cross rib 110b, the left longitudinal rib 120a, and the right longitudinal rib 120b has a rounded shape formed by the front curved surfaces 113a and 113b of the back cross rib 110b and the back curved surfaces 114a and 114b of the front cross rib 110a. Accordingly, on the horizontal plane, compared with the case where the cross rib 110 is orthogonally connected to the longitudinal rib 120, the connecting portion where the cross rib 110 and the longitudinal rib 120 are connected becomes a smooth curved surface, and accordingly, dirt such as urine is less likely to be accumulated in the connecting portion. Here, the "horizontal plane" refers to a surface constituted by the front-back direction and the lateral direction.

It should be noted that a configuration is acceptable in which the front curved surfaces 113a and 113b and the back curved surfaces 114a and 114b are not provided in the portion of the cross rib 110 that is connected to the longitudinal rib 120. For example, a plurality of holes 12a having a rectangular shape when the urine passage portion 100 is viewed along the vertical direction may be formed.

Further, in FIG. 4B, the lowermost portion 110L of the cross rib 110 corresponds to the boundary with the longitudinal rib 120 in the lower inclined surface 112a. In one or more embodiments, the position of the lowermost portion 110L in the vertical direction is the same as the position of a lowermost portion 120L of the longitudinal rib 120 in the vertical direction. It should be noted that the lowermost portion 120L of the longitudinal rib 120 is a farthest-protruding-downward portion of the longitudinal rib 120.

As shown in FIG. 4B, in the upper portion of the longitudinal rib 120, a second upper curved surface 121 that is curved upward is provided. The second upper curved surface 121 is formed continuing to the upper inclined surface 111a of the cross rib 110. Therefore, in one or more embodiments, the first upper curved surface 111 of the cross rib 110 continues to the second upper curved surface 121 of the longitudinal rib 120.

This makes urine or the like less likely to be accumulated on the upper part of the longitudinal rib 120 and more likely to flow downward. Further, since the second upper curved surface 121 of the longitudinal rib 120 is smoothly continuous with the upper inclined surface 111a of the cross rib 110, it is possible to suppress a case where dirt such as urine is accumulated on the boundary portion between the cross rib 110 and the longitudinal rib 120. It should be noted that the second upper curved surface 121 that is continuous with the first upper curved surface 111 of the cross rib 110 is not necessarily provided on the upper side of the longitudinal rib 120.

Similarly, as shown in FIG. 4B, in the lower portion of the longitudinal rib 120, a second lower curved surface 122 that is curved downward is provided. The second lower curved surface 122 is formed continuing to the lower inclined surface 112a of the cross rib 110. Therefore, in one or more embodiments, the first lower curved surface 112 of the cross rib 110 continues to the second lower curved surface 122 of the longitudinal rib 120.

Since the second lower curved surface 122 is provided also in the lower portion of the longitudinal rib 120, urine or the like that has flowed downward along the longitudinal rib 120 from above is not accumulated on the lower part of the longitudinal rib 120, thus directly flowing down toward the lower container 30. Then, since the second lower curved surface 122 of the longitudinal rib 120 is smoothly continuous to the first lower curved surface 112 of the cross rib 110, similarly to the upper side of the bottom portion 12, also on the lower side (the back side), it is possible to suppress a case where dirt such as urine is accumulated on the boundary portion between the cross rib 110 and the longitudinal rib 120.

Further, as shown in FIG. 4B, in the lower portion of the longitudinal rib 120 (below the position of Dmax in the drawing), the dimension D of the longitudinal rib 120 in the width direction (lateral direction) that crosses the longitudinal direction (front-back direction) and the vertical direction decreases as it goes toward the lower end. It should be noted that, though the dimension D does not have to necessarily decrease as it goes toward the lower end of the longitudinal rib 120, such a configuration realizes the following effect: urine that has flowed down the longitudinal rib 120 from above, urine that has flowed down the first lower curved surface 112 of the cross rib 110, or the like is accumulated on the lowermost portion 120L and become large droplets, making urine more likely to fall down with its own weight, consequently improving drainage.

Configuration of Tray 20

Figure 5:
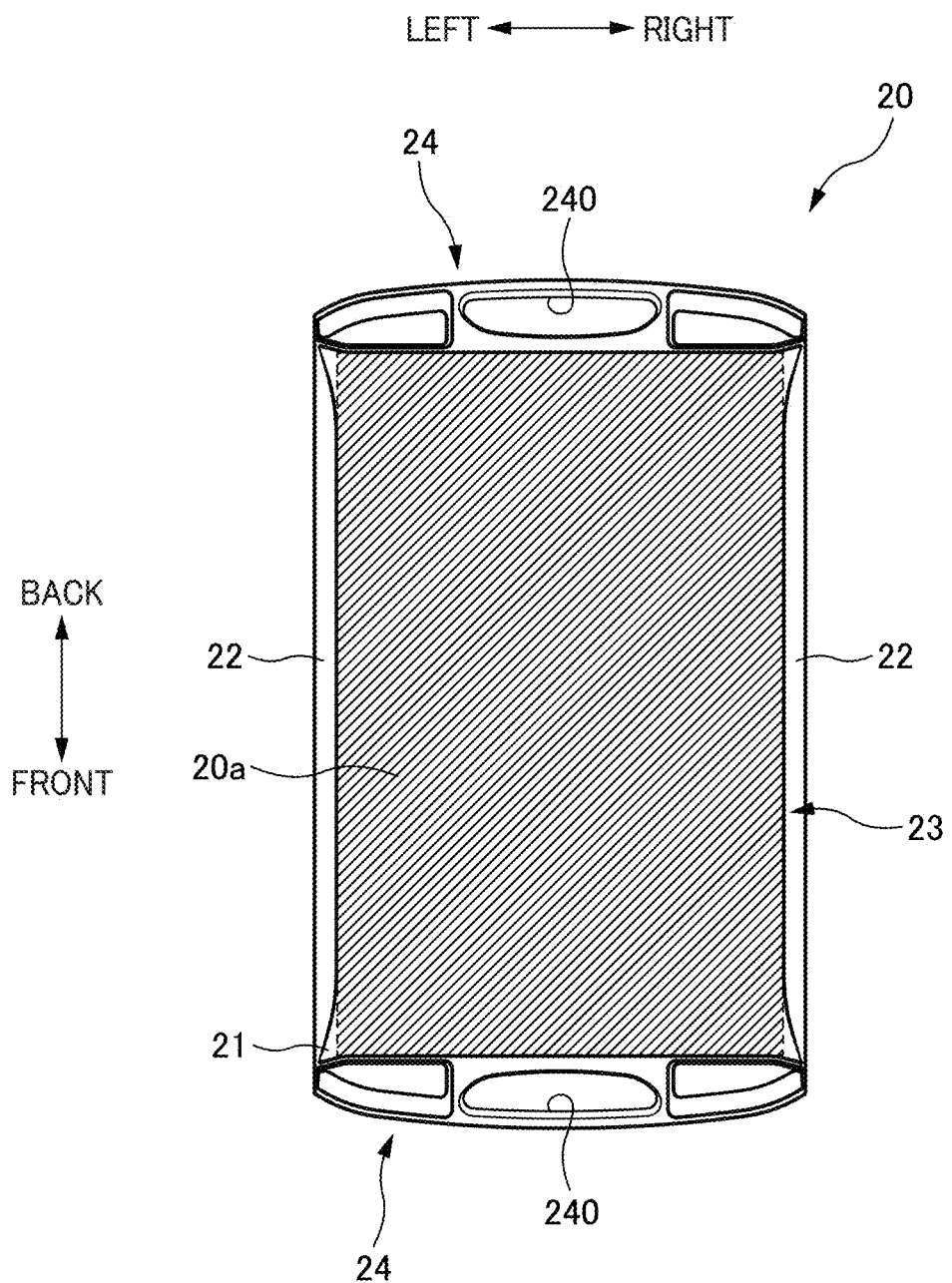
FIG. 5 is a plan view of a tray according to one or more embodiments.

FIG. 5 is a plan view of the tray 20. The tray 20 is a flat and box-shaped container with a shallow bottom in which the absorbent body 20a absorbing urine that has passed through the urine passage portion 100 of the upper container 10 is placed. The tray 20 has a bottom portion 21, side portions 22, an absorbent-body placement portion 23, and handle portions 24.

The bottom portion 21 is a portion that forms the bottom surface of the tray 20, and as shown in FIG. 5, the planar shape thereof is rectangular.

The side portions 22 each are a wall-shaped portion formed in the end portion of the bottom portion 21 so as to surround the outer periphery of the tray 20.

The absorbent-body placement portion 23 is a region in which the absorbent body 20a that absorbs urine or the like is placed on the bottom portion 21. The absorbent-body placement portion 23 is formed by being surrounded by the side portions 22. FIG. 5 shows a state where the absorbent body 20a (shown by the hatched portion in the drawing) is placed in the absorbent-body placement portion 23. The absorbent body 20a is a liquid-absorbent sheet member that absorbs urine excreted by an animal such as a cat, and is formed of a liquid-absorbent material such as pulp fibers or superabsorbent polymer. Further, deodorant microcapsules and an antimicrobial agent may be provided in the absorbent body 20a in order to trap the odor of absorbed urine and prevent the propagation of various bacteria. It should be noted that in FIG. 5, the absorbent body 20a is shown as a rectangular sheet member, but the shape of the absorbent body 20a is not limited as long as it can be held in the absorbent-body placement portion 23.

The handle portions 24 are portions formed in two front-back end portions of the tray 20. When inserting the tray 20 into the lower container 30 or pulling out the tray 20 from the lower container 30, the handle portion 24 is held and moved so that the tray 20 can slidingly move in the front-back direction. It should be noted that the tray 20 of one or more embodiments has a symmetrical shape in the front-back direction, and this makes it possible to accommodate it in the lower container 30 with the front-back direction of the tray 20 reversed. The handle portion 24 is formed with a hooking hole 240 for hooking a hand when putting in or taking out (attaching and detaching) the tray 20 to or from an accommodation space 36 of the lower container 30.

Configuration of Lower Container 30

Figure 6A:
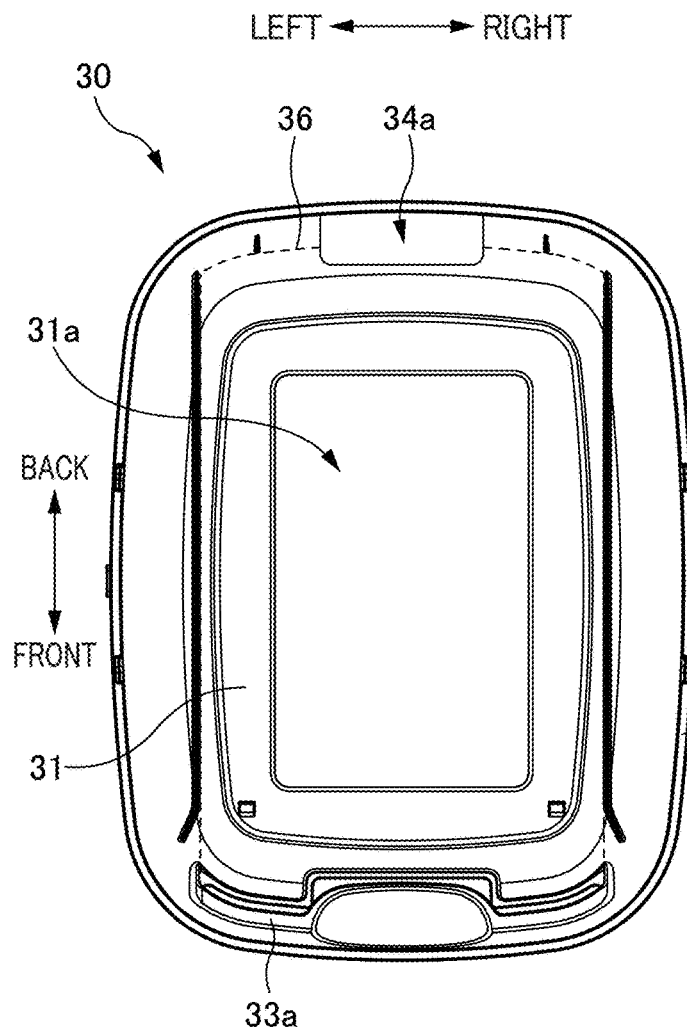
FIG. 6A is a top view of a lower container according to one or more embodiments.
Figure 6B:
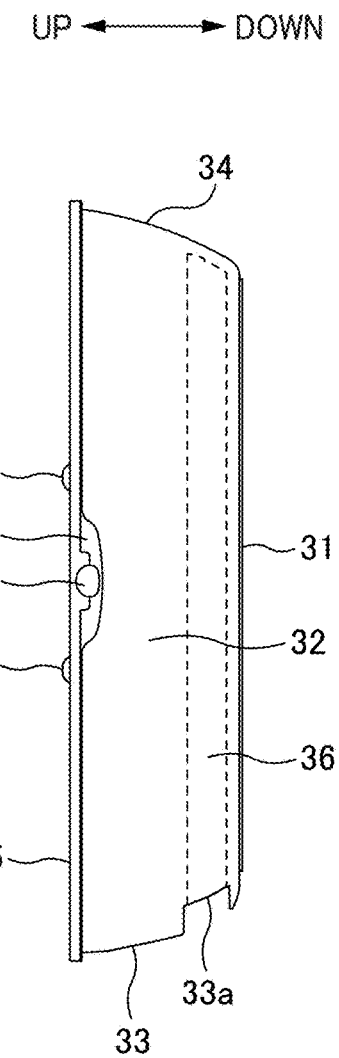
FIG. 6B is a right side view of the lower container according to one or more embodiments.
Figure 6C:
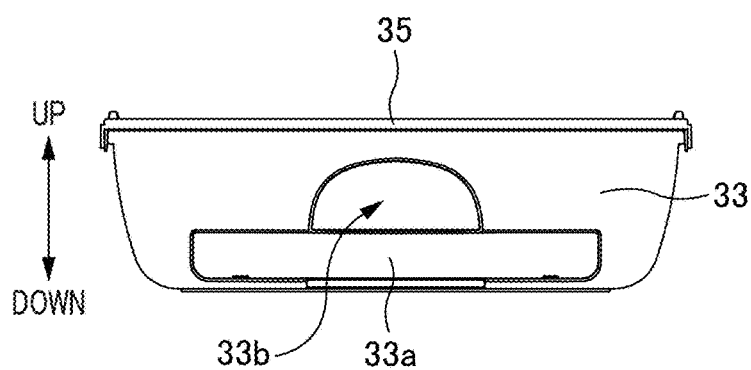
FIG. 6C is a front view of the lower container according to one or more embodiments.

FIG. 6A is a top view of the lower container 30. FIG. 6B is a right side view of the lower container 30. FIG. 6C is a front view of the lower container 30.

The lower container 30 is a substantially box-shaped member having an open upper portion, and is placed being stacked below and attached to the upper container 10 as shown in FIGS. 1 and 2 while the animal litter box 1 is in use. Then, the lower container 30 supports the upper container 10 from below.

The lower container 30 includes a bottom portion 31, side wall portions 32, a front wall portion 33, a back wall portion 34, a folded-back portion 35, and an accommodation space 36.

The bottom portion 31 is a portion that constitutes the bottom surface of the lower container 30. In the bottom portion 31 of one or more embodiments, as shown in FIG. 6A, a bottom opening portion 31a (corresponding to an opening portion) that penetrates in the vertical direction is provided. It should be noted that, although not shown, a part of the lower surface of the bottom portion 31 (for example, a line-shaped portion that surrounds the periphery of a bottom opening portion 31a in FIG. 6A) protrudes downward, and thus, unevenness is formed on the lower surface of the bottom portion 31.

The side wall portions 32 are portions that constitute the lateral side surfaces of the lower container 30, and are wall-shaped portions that stand upward from two lateral ends of the bottom portion 31.

The front wall portion 33 is a portion that constitutes the front surface of the lower container 30 and is a wall-shaped portion that stands from the front end of the bottom portion 31. In the front wall portion 33, there is provided an attach/detach opening portion 33a for inserting or taking out (attaching and detaching) the tray 20 to or from the accommodation space 36. It should be noted that in a state where the tray 20 is accommodated in the lower container 30, a gap G is formed between the tray 20 and the edge of the attach/detach opening portion 33a of the front wall portion 33 of the lower container 30. Further, as shown in FIGS. 1A and 6, in the front wall portion 33, there is formed a recessed portion 33b that, at the time of holding the tray 20 with a hand, prevents the hand (fingers) from coming into contact with the front wall portion 33.

The back wall portion 34 is a portion that constitutes the back surface of the lower container 30 and is a wall-shaped portion that stands from the back end of the bottom portion 31. As shown in FIG. 6B, the back wall portion 34 of one or more embodiments is inclined obliquely with respect to the vertical direction. Further, the back wall portion 34 is provided with a back wall opening portion 34a. Further, the back wall portion 34 (back wall opening portion 43a) is provided with a ventilator 50. The configuration of the ventilator 50 will be described later.

The folded-back portion 35 is a portion formed by folding back downward the upper ends of the side wall portions 32, the front wall portion 33, and the back wall portion 34. At positions of the folded-back portion 35 opposite to each other in the lateral direction, fitting pieces 352 each having a protruding portion 352a are formed overhanging downward. It should be noted that, in FIGS. 2 and 6B, only one fitting piece 352 of the two fitting pieces 352 is shown. Further, on the upper end of the folded-back portion 35, two protrusions 351 that protrude upward are provided at positions opposite to each other in the lateral direction. The protrusions 351 are placed in a space formed by the folded-back portion 15 of the upper container 10 when the upper container 10 is attached to the lower container 30. Accordingly, the lateral movement of the upper container 10 with respect to the lower container 30 is restrained.

The accommodation space 36 is a space for accommodating the tray 20 in the lower container 30. It should be noted that in FIGS. 2 and 6B, the accommodation space 36 is shown by a dashed line.

Configuration of Cover 40

The cover 40 includes an opening portion 41, side wall portions 42, a front wall portion 43, a back wall portion 44, and an overhanging portion 45.

The opening portion 41 is a portion that serves as an entrance for an animal to the animal litter box 1. The animal can enter or leave the animal litter box 1 from the opening portion 41.

The side wall portions 42 are wall-shaped portions respectively provided on two lateral sides of the opening portion 41.

The front wall portion 43 is a wall-shaped portion provided on the front side of the opening portion 41, and the back wall portion 44 is a wall-shaped portion provided on the back side of the opening portion 41. By providing such wall portions (the side wall portions 42, the front wall portion 43, and the back wall portion 44), the granular excrement treating material S (see FIG. 7) and excrement are prevented from spilling or scattering outside the animal litter box 1 (upper container 10). Further, in one or more embodiments, as shown in FIGS. 1 and 2, the side wall portions 42 are formed such that the height of the side wall portions becomes lower as it goes forward. Accordingly, in the back side, the granular excrement treating material S and excrement are prevented from scattering, whereas in the front side, it is possible to ensure a wide visibility of the animal so as to easily confirm the outside situation from inside the litter box. By ensuring sufficient visibility even during excretion, the animal can use the animal litter box 1 at ease.

The overhanging portion 45 is a portion overhanging downward from the lower ends of the side wall portions 42, the front wall portion 43, and the back wall portion 44. In one or more embodiments, the side wall portions 42, the front wall portion 43, the back wall portion 44, and the overhanging portion 45 are integrally formed. Further, the cover 40 does not have a bottom surface and penetrates in the vertical direction.

As shown in FIG. 2, in the overhanging portion 45, at positions opposite to each other in the lateral direction, fitting pieces 450 each having a through hole 450a are formed overhanging downward. It should be noted that, in FIG. 2, only one fitting piece 450 of the two fitting pieces 450 is shown. The through hole 450a is to be fitted with the protruding portion 352a of the lower container 30 when the cover 40 is attached to the lower container 30 to which the upper container 2 is mounted. In one or more embodiments, the through hole 450a is formed in a shape of a cat face.

When an animal such as a cat performs excretion, the animal enters the animal litter box 1 from the opening portion 41, and the animal excrete urine or the like to a portion of the urine passage portion 100 in which the granular excrement treating material S is arranged, on the upper surface of the upper container 10. The excreted urine passes through the plurality of holes 12a of the urine passage portion 100 and drops downward while being in contact with the excrement treating material S. The urine is absorbed by the absorbent body 20a arranged below the urine passage portion 100 and is stored in the tray 20. The pet owner or the like replaces periodically (for example, every week) the absorbent body 20a that has absorbed urine. Further, the feces does not pass through the holes 12a of the urine passage portion 100, but remains on the urine passage portion 100. The pet owner or the like removes the excrement treating material S in the portion contaminated with the excrement from the inside of the animal litter box 1 together with the excrement, and replenishes a new excrement treating material S by the amount removed.

However, even when such excrement is periodically treated, there is a risk that an unpleasant odor such as urine odor caused by urine stored in the tray 20 or fecal odor caused by feces that remains on the passage portion 100 comes up, causing discomfort to the pet owner or the like. Further, the unpleasant odor is more likely to be accumulated in the space between the tray 20 and the urine passage portion 100 of the upper container 10, and for example, the unpleasant odor diffuses when pulling out the tray 20 from the lower container 30 or the like. Therefore, in the animal litter box 1 of one or more embodiments, providing the ventilator 50 in the lower container 30 makes it possible to efficiently discharge (remove) the unpleasant odor.

Ventilator 50

Figure 7:
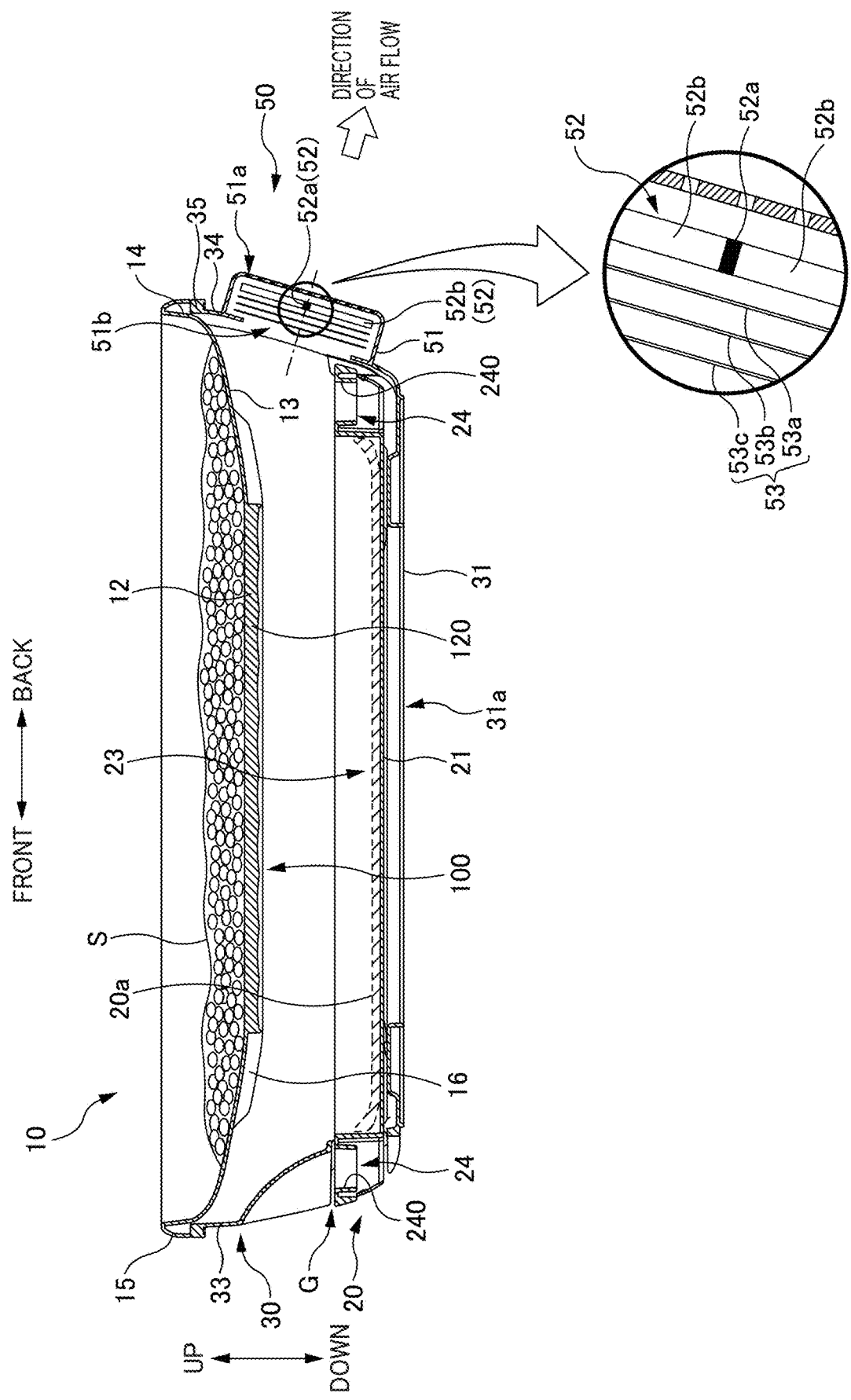
FIG. 7 is a schematic cross-sectional view of the animal litter box according to one or more embodiments.

FIG. 7 is a schematic cross-sectional view of the animal litter box 1 according to one or more embodiments. In the animal litter box 1 of one or more embodiments, as described above, the ventilator 50 is provided in the back wall portion 34 of the lower container 30. As shown in FIG. 7, the ventilator 50 of one or more embodiments includes a cover member 51, a fan 52 (corresponding to a ventilation fan), and a filter group 53. It should be noted that, for the sake of convenience, FIG. 7 shows a cross-section of wings 52b of the fan 52 in a rectangular shape.

The cover member 51 is a box-shaped member that surrounds the periphery of the fan 52, the filter group 53, and the like. The cover member 51 (for example, the ventilator 50) is detachably provided in the back wall portion 34 of the lower container 30. A method for attaching and detaching the cover member 51 is not particularly limited, and, for example, the following methods are acceptable: a method in which engaging portions that engage each other are located in the back wall portion 34 and latched; and a method in which the cover member 51 is slid along the surface of the back wall portion 34 and attached or detached.

On the back surface of the cover member 51, a plurality of discharge ports 51a are provided. In one or more embodiments, as shown in FIG. 1B, the discharge port 51a is formed in a straight-line shape. However, the shape is not limited to a straight-line shape, and another shape such as an arc-shaped opening (discharge port) may be used. The formation of the discharge port 51a in the cover member 51 makes it possible to discharge (transfer) air which has been sent from the fan 52, to the outside. Further, since the discharge port 51a is formed, the operation of the fan 52 can be confirmed from the outside. Accordingly, in the case where the rotation failure of the fan 52 or the like occurs, such failure is easily noticed.

Further, a vent hole 51b is provided on the front surface of the cover member 51. When the cover member 51 is attached to the back wall opening portion 34a of the lower container 30, the inside of the lower container 30 and the inside of the cover member 51 communicate with each other through the back wall opening portion 34a and the vent hole 51b. Further, since the discharge port 51a is formed in the cover member 51, air can be discharged from the inside of the lower container 30 through the discharge port 51a to the outside of the lower container 30.

The fan 52 has a rotation shaft 52a at the center and is rotatable around the rotation shaft 52a. Further, a plurality of wings 52b are provided around the rotation shaft 52a, and as the rotation shaft 52a rotates, the plurality of wings 52b also rotate to generate an air flow. In one or more embodiments, the fan 52 rotates so that air flows in a direction from the inside to the outside of the animal litter box 1, and discharges the air inside the animal litter box 1 to the outside.

In the case where the fan 52 is provided in the upper container 10 or the cover 40, there is a risk that the unpleasant odor cannot be efficiently discharged (removed). For example, there is a risk that the unpleasant odor is accumulated in the space between the upper container 10 and the lower container 30, or the unpleasant odor diffuses when pulling out the tray 20 from the lower container 30. Further, providing the fan 52 in the upper container 10 or the cover 40 increases a risk that urine is splashed to the fan 52 or a risk of interference with an animal.

In contrast, in one or more embodiments, since the fan 52 is provided in the lower container 30, it is possible to suck downward the unpleasant odor such as urine odor caused by urine absorbed by the absorbent body 20a of the animal litter box 1 or fecal odor caused by feces that remains on the urine passage portion 100. Accordingly, it is possible to prevent the unpleasant odor from coming up, making it possible to efficiently remove the unpleasant odor. Further, the unpleasant odor can be prevented from being accumulated in the space between the upper container 10 and the lower container 30, and the unpleasant odor can be prevented from diffusing when pulling out the tray 20 from the lower container 30. Further, providing the fan 52 in the lower container 30 reduces the risk that animal urine splashes on the fan 52. Further, the risk of interference with an animal is reduced.

It should be noted that it is desirable that at least a part of the fan 52 is positioned below the lower surface of the urine passage portion 100 of the upper container 10. This can make air likely to flow from the hole 12a of the urine passage portion 100 to the fan 52, making it possible to suck the unpleasant odor smoothly downward through the urine passage portion 100.

In one or more embodiments, as shown in FIG. 7, the rotation shaft 52a of the fan 52 is positioned below the lower surface of the urine passage portion 100 of the upper container 10 in the vertical direction. This can make air more likely to flow from the hole 12a of the urine passage portion 100 to the fan 52, making it possible to suck the unpleasant odor smoothly downward.

Further, in FIG. 7, the axial direction of the rotation shaft 52a is shown by a single-dotted chain line. As shown in FIG. 7, the rotation shaft 52a extends along a direction (hereinafter, also referred to as an oblique direction) that rises upward in the vertical direction as it goes inward from the outward side (here, from the back side to the front side in the front-back direction) along the rotation shaft 52a. In other words, the fan 52 is arranged obliquely with respect to the vertical direction. Accordingly, by obliquely arranging the fan 52, it is possible to enhance the ventilation efficiency. In addition, the unpleasant odor of the urine passage portion 100 can be more likely to be sucked, and further, the urine attached to the urine passage portion 100 can be likely to be dropped onto the absorbent body 20a of the tray 20. In particular, in one or more embodiments, as shown in FIG. 4B, since the lower portion of the urine passage portion 100 has the first lower curved surface 112 and the like formed thereon, urine is likely to be guided to the lower end of the intersecting portion of the cross rib 110 and the longitudinal rib 120. Such a configuration of the urine passage portion 100 and the air flow by the fan 52 makes it possible to further facilitate the dropping of urine attached to the urine passage portion 100.

It should be noted that in one or more embodiments, the back wall portion 34 of the lower container 30 is inclined with respect to the vertical direction. Specifically, the back wall portion 34 is inclined backward. Since the ventilator 50 is attached to the back wall portion 34, it makes the rotation shaft 52a of the fan 52 easier to extend along the oblique direction (the fan 52 can be arranged obliquely).

Further, in one or more embodiments, since the plurality of holes 12a are formed in the urine passage portion 100 of the upper container 10 of the animal litter box 1, air flows from the holes 12a of the urine passage portion 100 to the outside of the litter box through the fan 52 and the discharge port 51a. Therefore, the unpleasant odor of the urine passage portion 100 (fecal odor on the urine passage portion 100 or urine odor coming up from the absorbent body 20a) can be guided downward, and the diffusion of the unpleasant odor can be prevented without covering the animal litter box 1.

Further, in a state where the tray 20 is accommodated in the lower container 30, a gap G is formed between the tray 20 and the edge part of the attach/detach opening portion 33a of the front wall portion 33 of the lower container 30. This makes air likely to flow from the front side to the back side (fan 52) of the lower container 30. Therefore, the air flow can be enhanced. Further, the air flow is improved by the bottom opening portion 31a and the uneven shape of the lower surface of the above-mentioned bottom portion 31, making it possible to enhance the ventilation efficiency.

Note that it is desirable that the fan 52 is a silent fan whose noise level during rotation is 40 dB or less. Accordingly, an animal can perform excretion calmly (it is possible to prevent the animal become reluctant to excrete due to the rotation sound of the fan 52).

Further, it is desirable that the size of the fan 52 is adapted for the size of the lower container 30. Specifically, it is preferable that the height dimension of the fan 52 (and the filters of the filter group 53) is in a range of 4 mm to 400 mm inclusive. Accordingly, it is possible to reduce the height of the animal litter box 1, making it possible to prevent the position of the entrance (the opening portion 41 of the cover 40) from being too high.

The filter group 53 is provided on the inner side (here, on the front side) with respect to the fan 52. The filter group 53 of one or more embodiments has a three-layer structure, and three filters (a deodorization filter 53a, a litter-preventing filter 53b, and a water-repellent filter 53c) are arranged overlaid on each other.

The deodorization filter 53a is a filter formed using a deodorant such as activated carbon and is arranged on the inner side with respect to the fan 52. By providing the deodorization filter 53a, when the ventilation fan 52 rotates to generate an air flow, the unpleasant odor component of the animal litter box 1 can be adsorbed by the deodorization filter 53a. Accordingly, the unpleasant odor can be prevented from diffusing to the outside (living space) of the animal litter box 1.

The litter-preventing filter 53b is a filter that is coarser than the deodorization filter 53a, and is arranged on the inner side with respect to the deodorization filter 53a and the fan 52. By providing the litter-preventing filter 53b, it is possible to prevent clogging of the deodorization filter 53a due to powder of the excrement treating material S (such as cat litter) arranged on the urine passage portion 100 or the like, and also to prevent rotation failure of the fan 52.

The water-repellent filter 53c is a filter that has water repellency and is arranged on the inner side with respect to the litter-preventing filter 53b. In other words, the water-repellent filter 53c is arranged on the inner side with respect to the deodorization filter 53a and the fan 52. By providing the water-repellent filter 53c, it is possible to repel the scattered urine or the like, making it possible to prevent the fan 52 or the like from getting wet with urine.

In one or more embodiments, the filters (the deodorization filter 53a, the litter-preventing filter 53b, and the water-repellent filter 53c) of the filter group 53 are detachably provided on the cover member 51. Specifically, for example, the upper surface of the cover member 51 is provided so as to be capable of opening and closing, and each filter can be taken out and inserted by opening the upper surface. Accordingly, maintenance (cleaning) and replacement of the filters can be performed. Further, in this case, maintenance (cleaning) and replacement of the filters can be performed without removing the ventilator 50 from the lower container 30.

Figure 8:
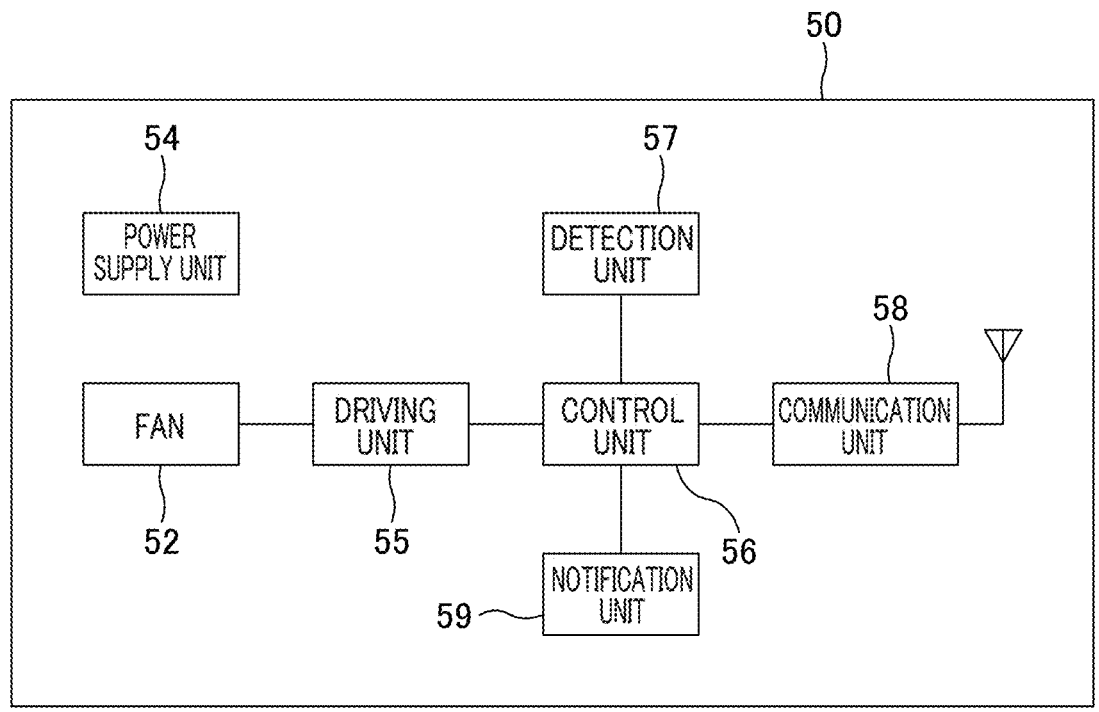
FIG. 8 is a schematic block diagram showing the configuration of a ventilator according to one or more embodiments.

FIG. 8 is a schematic block diagram showing an example of the configuration of the ventilator 50. As shown in FIG. 8, the ventilator 50 includes a power supply unit 54, a driving unit 55, a control unit 56, a detection unit 57, a communication unit 58, and a notification unit 59.

The power supply unit 54 supplies electric power to each unit of the ventilator 50. For example, it is desirable that the power supply unit 54 is a direct current power supply (DC power supply) using a battery (battery). In this case, the animal litter box 1 can be placed in a location where the household power outlet is not in the vicinity, making the placement location less likely to be restricted. As the battery, it is possible to use a dry battery, a small button battery, or the like. Further, the battery may be a one-time-use battery (primary battery) or a type of battery (secondary battery) that can be used repeatedly by charging. In addition, an alternating current power supply (AC power supply) that supplies electric power through a cord from an external power supply such as a household power outlet may be used. In this case, it is desirable to use a power cord with a tamper-proof cord guard since there is a risk that the animal may get caught on the cord or get an electric shock.

The driving unit 55 is a unit that generates a driving force for driving (rotating) the fan 52, and is configured to include, for example, a motor.

The control unit 56 is a unit that controls the units of the ventilator 50, and controls the amount of rotation of the fan 52 through, for example, the driving unit 55.

The detection unit 57 detects the state of the animal litter box 1. As the detection unit 57, it is possible to use an odor sensor that detects the intensity of odor (odor intensity), for example. In the case where such an odor sensor is provided, the rotational strength of the fan 52 may be automatically changed according to the odor intensity detected by the odor sensor. Specifically, the control unit 56 may control the driving unit 55 according to the odor intensity as follow: when the odor intensity detected by the odor sensor is large, to increase the number of rotations of the fan 52; and when the odor intensity is small, to decrease the number of rotations of the fan 52. Accordingly, power saving and noise reduction can be achieved when the odor intensity is small. Also, when the odor intensity is large, the unpleasant odor can be further discharged. It should be noted that the configuration is not limited to be automatic, and an owner or the like may manually set (change) the rotational strength of the fan 52.

The communication unit 58 is a unit that performs wireless communication with a sensor (not shown) and the like which are located at locations excluding the ventilator 50 of the animal litter box 1. For example, by providing a motion sensor (such as a camera, an infrared sensor, a load sensor, a temperature detection sensor or the like) on the upper container 10, the lower container 30, the cover 40 or the like of the animal litter box 1, it is possible to detect the entering or leaving of the animal to and from the animal litter box 1. In this case, the following configuration is acceptable: the communication unit 58 receives the detection result of the motion sensor, and the control unit 56 on or off the driving (rotation) of the fan 52 according to the received result. For example, the following configuration is acceptable: the fan 52 stops while the animal is in the animal litter box 1 (during excretion), and the fan 52 rotates after the animal leaves the animal litter box 1 (after excretion). Accordingly, at the time of animal excretion, it does not generate the air flow by the fan 52 and the rotation sound of the fan 52. This makes it possible to prevent affecting the excretion behavior of the animal. Further, the presence or absence of feces of the animal can be detected by the motion sensor. Therefore, in the case where, for example, a plurality of ventilators 50 (fans 52) are placed, the fans 52 which are respectively optimal for feces and urine are selectively activated.

Further, in the case where the owner collects urine from the animal, it is desirable that there is no air circulation during urination collection in order to prevent the evaporation of urine. Therefore, the rotation of the fan 52 may be turned off for a certain time after the excretion of the animal.

Further, a configuration may be acceptable: by providing a temperature-humidity sensor, it automatically adjusts the number of rotations of the fan 52 so as to obtain the optimum humidity for the litter box for animals (for example, cats). Accordingly, the propagation of bacteria in high humidity can be suppressed.

It should be noted that, a configuration may be acceptable: the above-described odor sensor is provided, for example, in the lower container 30 so as to wirelessly communicate with the communication unit 58. Further, in this case, if the ventilator 50 is fixed to the lower container 30 (that is, when the ventilator 50 is not detachable from the lower container 30), communication may be performed by wire.

The notification unit 59 is a unit for performing notification of, for example, the time to perform maintenance for or to replace each filter of the filter group 53, and includes an LED lamp, an indicator, or the like. It should be noted that, as a method for detecting the replacement timing of a filter, there are the following methods, for example: a method in which the detection unit 57 detects the amount of substance which has been adsorbed by the filter and the replacement timing is determined based on the amount of the filter-adsorbed substance; and a method in which a timer (not shown) is provided and the replacement timing is determined based on the time elapsed from the previous replacement of the filter. The result (the amount of the adsorbed substance or the elapsed time) may be notified by using the notification unit 59 (LED lamp or indicator). Accordingly, the filter can be subject to maintenance or be replaced at a suitable timing, making it possible to prevent clogging of the filter, so that power consumption can be reduced.

Further, when collecting urine as described above, the notification unit 59 (LED lamp or indicator) may notify that a certain period of time has elapsed (the period during which the fan 52 is turned off has ended).

Modified Example

Figure 9:
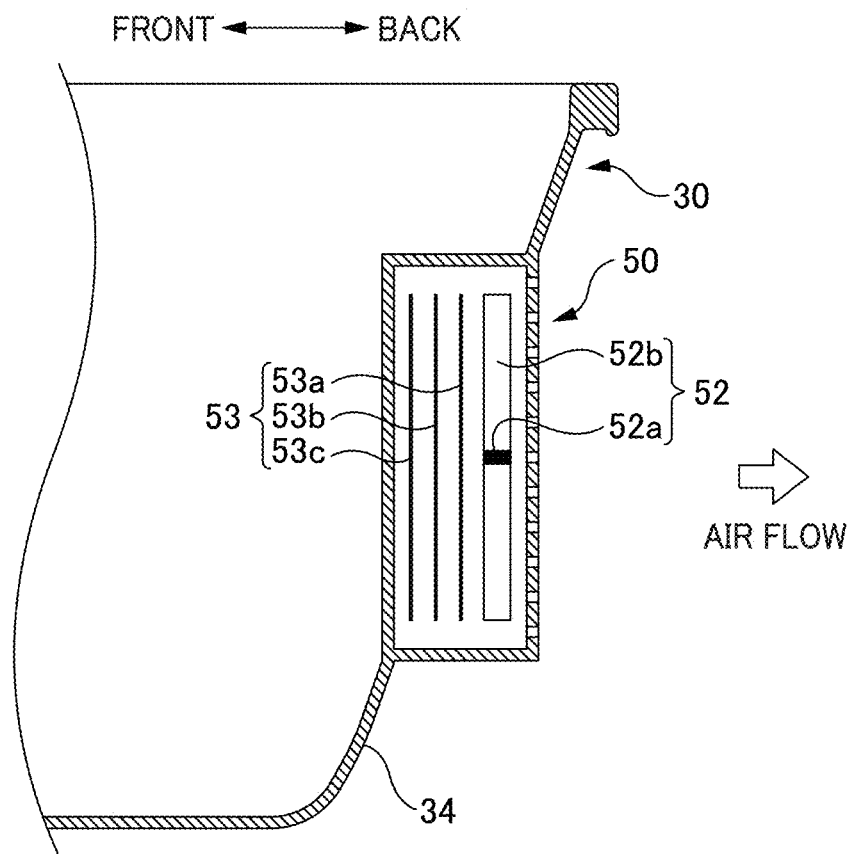
FIG. 9 is an explanatory diagram illustrating a modified example of one or more embodiments.

FIG. 9 is an explanatory diagram illustrating a modified example of the first example. It should be noted that, in FIG. 9, portions having the same configurations as those of the first example are denoted by the same reference signs, and the descriptions thereof are omitted.

In this modified example, the ventilator 50 (fan 52) is provided in the back wall portion 34 of the lower container 30 perpendicular to the horizontal plane as shown in FIG. 9. That is, in this modified example, the rotation shaft 52a of the fan 52 extends along the horizontal direction (here, the front-back direction). As described above, the fan 52 may be provided perpendicular to the horizontal plane such as the floor (the fan 52 does not have to be provided obliquely). Further, the configuration is not limited thereto. For example, in the case where the back wall portion 34 of the lower container 30 is formed perpendicular to the floor (horizontal plane), providing the ventilator 50 in the back wall portion 34 may make the fan 52 be arranged perpendicular to the horizontal plane.

Figure 10:
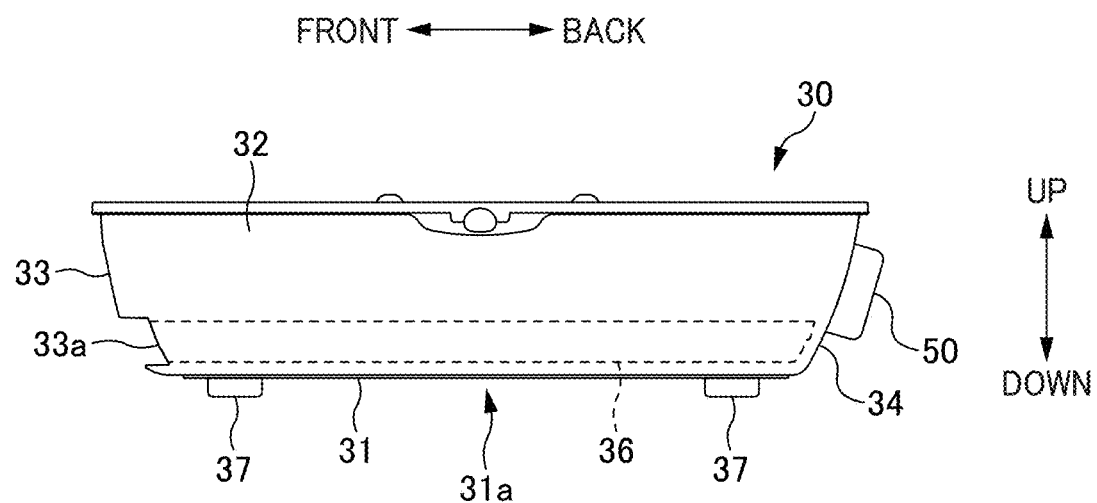
FIG. 10 is an explanatory diagram illustrating another modified example of one or more embodiments.

FIG. 10 is an explanatory diagram illustrating another modified example of the first example. It should be noted that, in FIG. 10, portions having the same configurations as those of the first example are denoted by the same reference signs, and the descriptions thereof are omitted.

In this modified example, as shown in FIG. 10, leg portions 37 are provided on the bottom portion 31 of the lower container 30. The leg portions 37 are provided so as to protrude downward from the lower surface of the bottom portion 31 (great unevenness is formed on the lower surface of the bottom portion 31). Further, a plurality of (e.g., four) leg portions 37 are provided with spaces on the lower surface of the bottom portion 31, and support the animal litter box 1 when the animal litter box 1 is placed on the floor or the like. By providing the leg portions 37 in this manner, the bottom portion 31 is separated away from the floor when the animal litter box 1 is placed on the floor or the like. Accordingly, air can easily flow from the bottom opening portion 31a (see FIG. 6A) of the bottom portion 31 to the inside of the lower container 30. Accordingly, the air flow can be further enhanced. It should be noted that the shape and number of the leg portions 37 are not particularly limited. For example, leg portions extending along the front-back direction may be provided on two lateral sides where the bottom opening portion 31a is placed in between.

Second Example

Figure 11A:
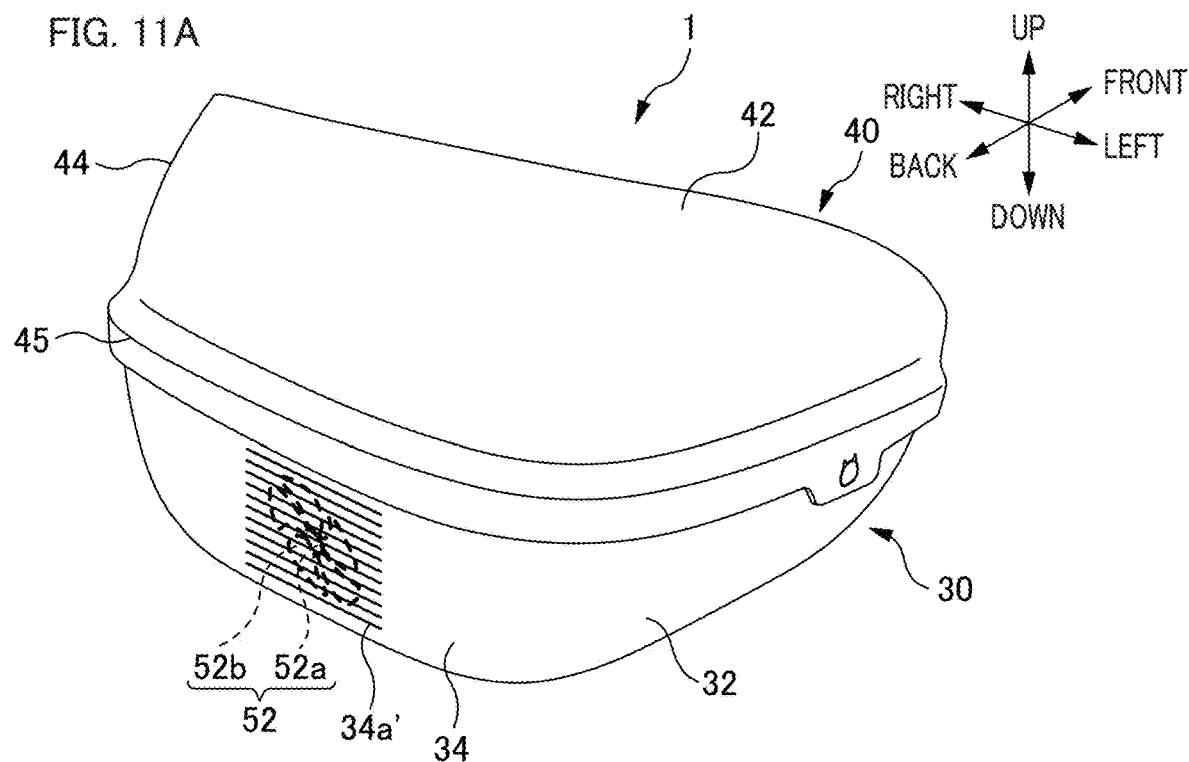
FIG. 11A is a schematic perspective view of an animal litter box according to one or more embodiments when viewed from the back side.
Figure 11B:
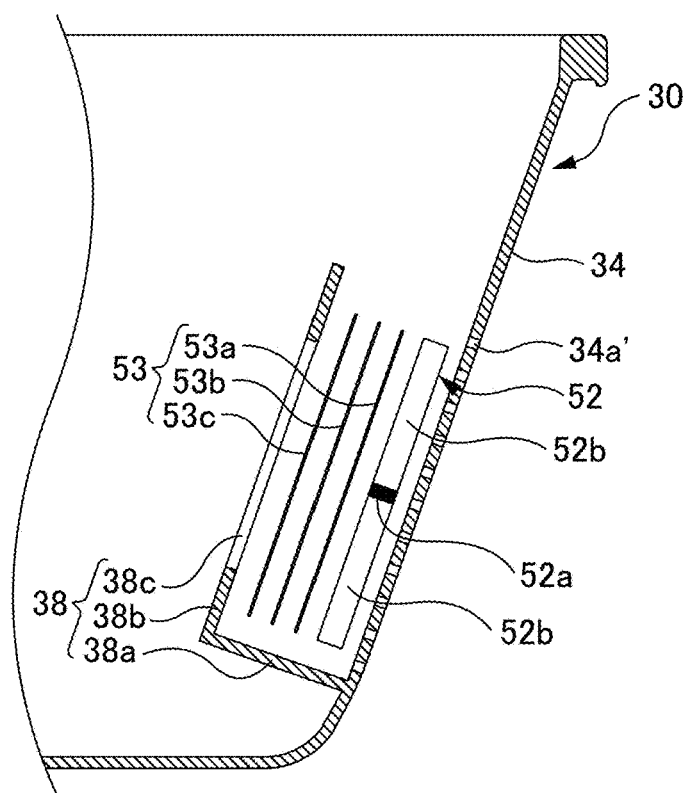
FIG. 11B is a schematic cross-sectional view of the vicinity of a back wall portion of a lower container of one or more embodiments.

In one or more embodiments, the fan 52 and the filter group 53 are provided inside the lower container 30 (back wall portion 34). FIG. 11A is a schematic perspective view of the animal litter box 1 according to one or more embodiments when viewed from the back side, and FIG. 11B is a schematic cross-sectional view of the vicinity of the back wall portion 34 of the lower container 30 of one or more embodiments. It should be noted that, portions having the same configurations as those of the above-described embodiments are denoted by the same reference signs, and the descriptions thereof are omitted.

As shown in FIGS. 11A and 11B, in one or more embodiments, a back wall opening portion 34a' is provided in the back wall portion 34. The back wall opening portion 34a' has the same shape as that of the discharge port 51a of the cover member 51 of the first example, and a plurality of back wall opening portions 34a' are provided in the back wall portion 34. Further, a housing portion 38 for accommodating the fan 52, the filter group 53, and the like is provided inside (here, on the front side) the back wall portion 34.

The housing portion 38 includes: a housing bottom portion 38a that constitutes the bottom surface of the housing portion 38; a housing front wall portion 38b that constitutes the front surface of the housing portion 38; and a housing opening portion 38c that is opened in the housing front wall portion 38b. Further, at the lateral ends of the housing bottom portion 38a, there are provided housing side wall portions (not shown) that constitute lateral side surfaces. The fan 52 and the filter group 53 are detachably accommodated in a space surrounded by the housing bottom portion 38a, the housing front wall portion 38b, the housing side wall portions (not shown), and the back wall portion 34. It should be noted that, the following configurations are acceptable: the fan 52 and the filter group 53 are provided in a single member such as the cover member 51 of the above-described embodiments so as to be capable of integrally detaching; or the fan 52 and the filter group 53 are provided so as to be capable of separately detaching.

In one or more embodiments, the fan 52 rotates around the rotation shaft 52a, and therefore air flows in the direction of the back wall opening portion 34a' from the housing opening portion 38c (outward from the inner side). Accordingly, the unpleasant odor of the animal litter box 1 can be efficiently removed.

It should be noted that, also in one or more embodiments, it is desirable that the rotation shaft 52a of the fan 52 is positioned below the lower surface of the urine passage portion 100 (not shown) of the upper container 10. Accordingly, the unpleasant odor can be likely to be sucked downward through the urine passage portion 100.

Further, in the case of one or more embodiments, it is desirable that the rotation shaft 52a extends along the oblique direction, inside the lower container 30 (the fan 52 is arranged obliquely inside the lower container 30). Accordingly, the ventilation efficiency can be enhanced. However, the configuration is not limited thereto. For example, as in the modified example (FIG. 9) of the first example, the fan 52 may be arranged perpendicular to the horizontal plane (here, perpendicular inside the lower container 30). That is, the rotation shaft 52a of the fan 52 may extend along the horizontal direction (here, the front-back direction).

As described above, in one or more embodiments, the fan 52 and the filter group 53 are arranged inside the lower container 30 (back wall portion 34). Also in this case, the unpleasant odor can be efficiently removed.

Third Example

Figure 12:
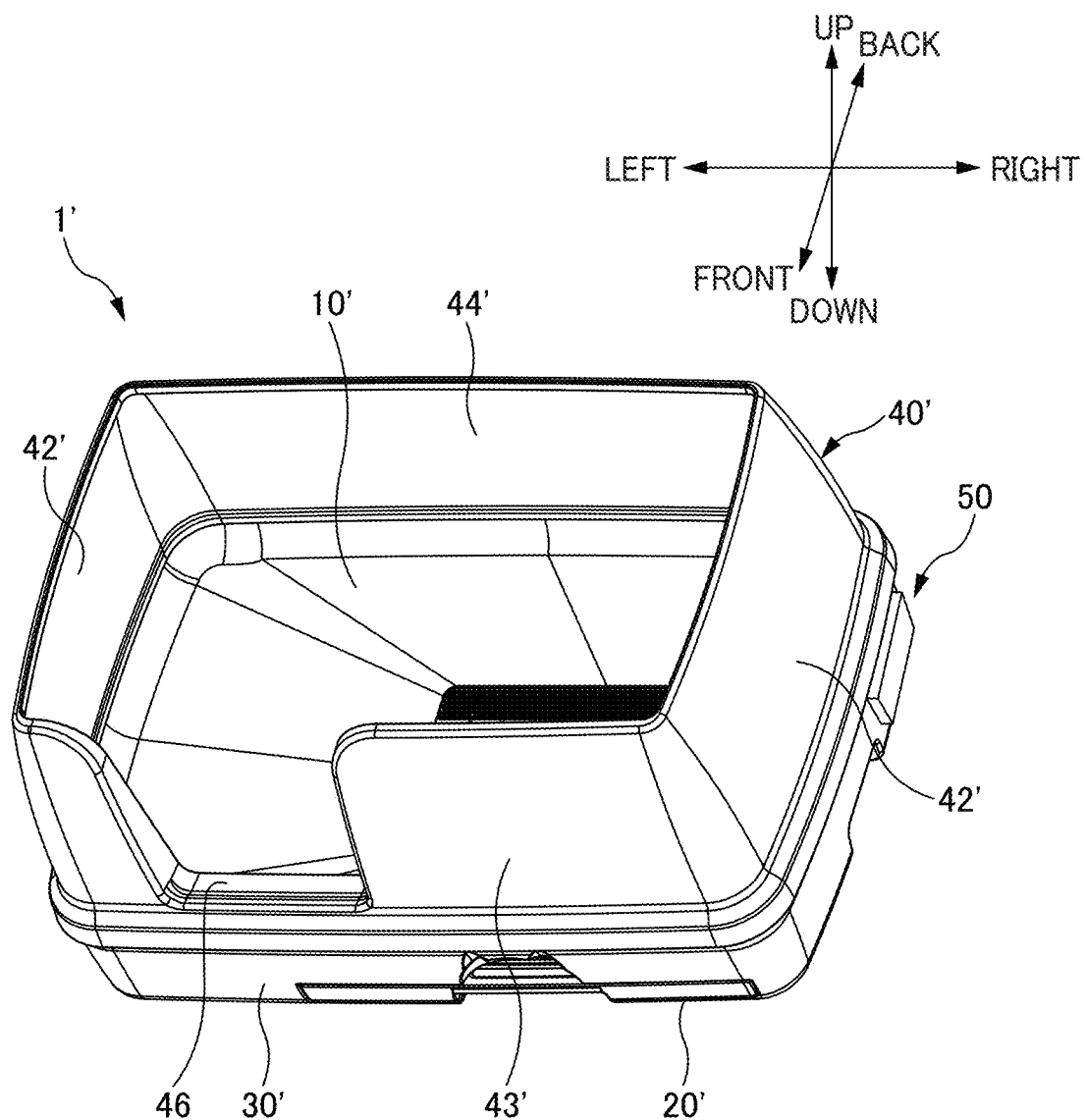
FIG. 12 is a schematic perspective view of an animal litter box according to one or more embodiments.
Figure 13:
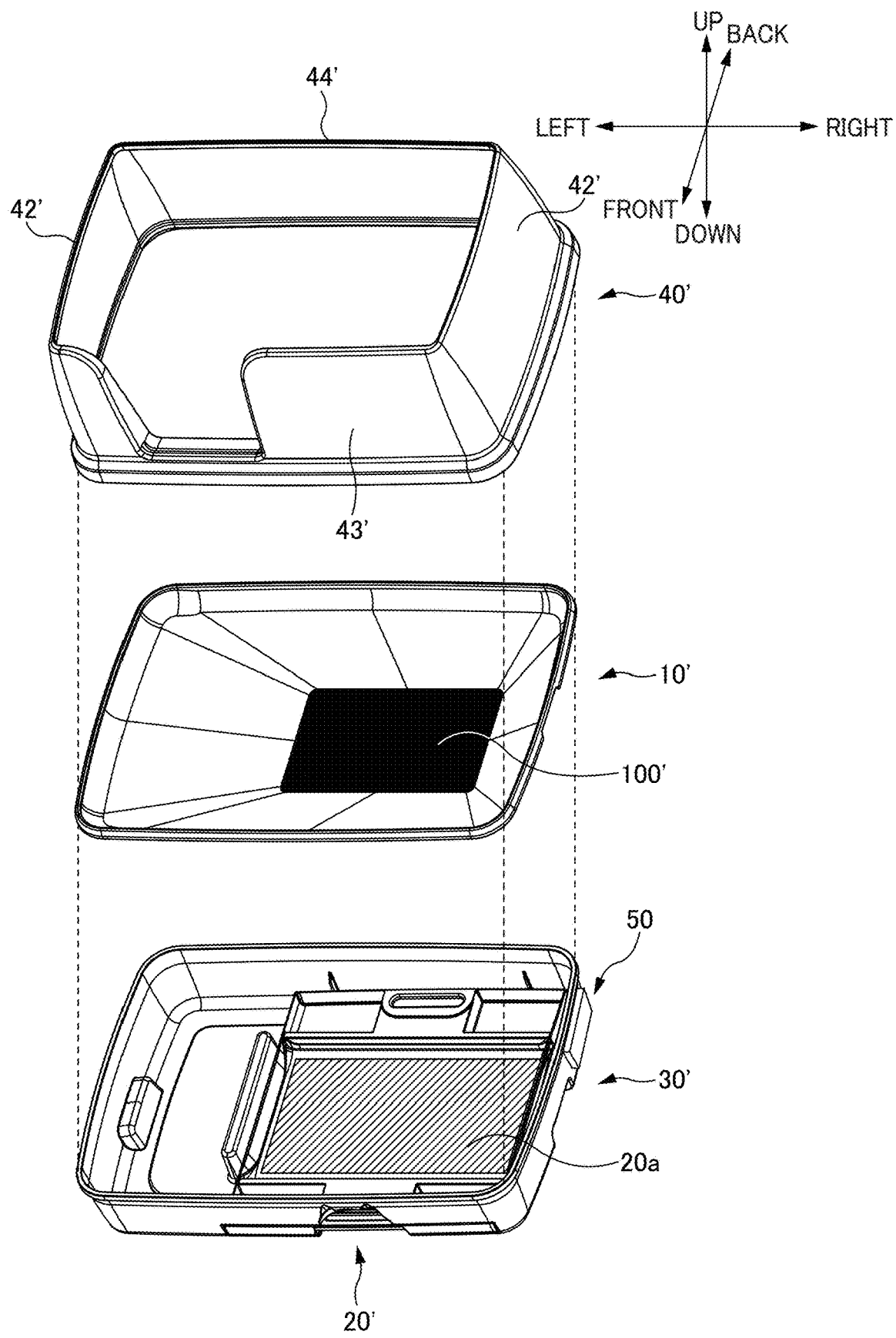
FIG. 13 is an exploded perspective view of the animal litter box according to one or more embodiments.
Figure 14:
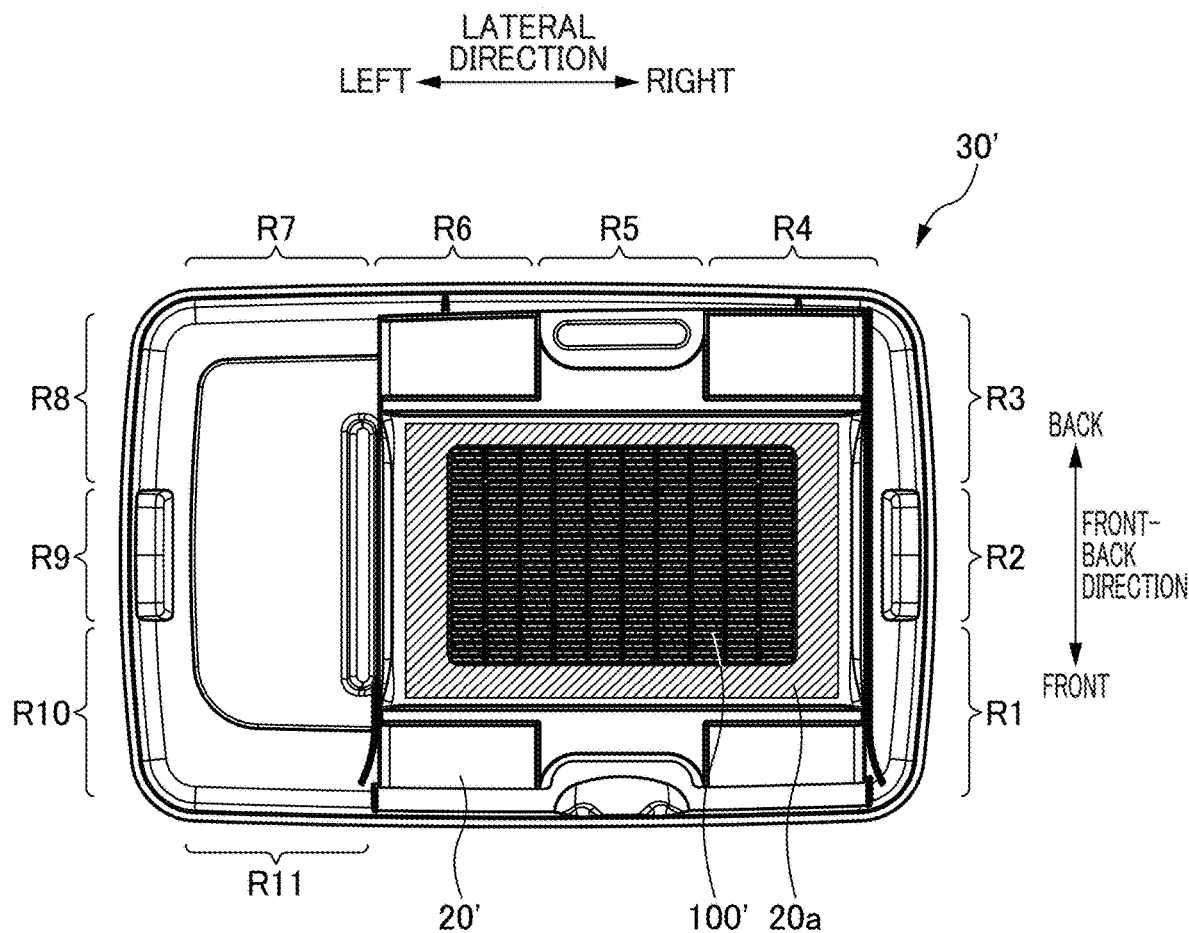
FIG. 14 is a plan view showing the arrangement of a lower container and a tray according to one or more embodiments.

FIG. 12 is a schematic perspective view of an animal litter box 1' according to one or more embodiments, and FIG. 13 is a schematic exploded perspective view of the animal litter box 1' according to one or more embodiments. Further, FIG. 14 is a plan view showing the arrangement of a lower container 30' and a tray 20'. It should be noted that, for the purpose of description, FIG. 14 shows the position of a urine passage portion 100' when put below an upper container 10'.

The animal litter box 1' of one or more embodiments is a litter box having a different aspect (an aspect in which the positions of the urine passage portion and the absorbent body are eccentric with respect to the center) from the animal litter box 1 of the above-described embodiments.

In one or more embodiments, the front-back direction is a direction extending along the transverse direction of the animal litter box 1', and the lateral direction is a direction extending along the longitudinal direction of the animal litter box 1'. Similar to the first example, regarding the directions (front-back direction, lateral direction, and vertical direction), "front", "back", "right", "left", "up", and "down" are defined. For example, the side on which the tray 20' is pull out from the lower container 30' in the front-back direction is referred to as the "front" side.

The animal litter box 1' includes an upper container 10', a lower container 30', a tray 20' which is accommodated in the lower container 30', and a cover 40'. Further, a ventilator 50 is provided in the animal litter box 1'.

The upper container 10' of one or more embodiments is a box-shaped member having an open upper side, and has a rectangular shape as shown in FIG. 13 when viewed from above, and the lateral length is longer than the front-back-direction length. That is, the long side of the rectangular shape is formed extending along the lateral direction, and the short side of the rectangular shape is formed extending along the front-back direction. Further, in the upper container 10', the urine passage portion 100' is provided eccentric to the right side with respect to the lateral center. The configuration of the urine passage portion 100' is substantially the same as that of the urine passage portion 100 of the above-described embodiments. However, the urine passage portion 100' of one or more embodiments has a laterally-elongated slit shape (see FIG. 14). Further, although not shown, the excrement treating material S is arranged on the urine passage portion 100' in the same manner as in the above-described embodiments.

The tray 20' is a flat and box-shaped container with a shallow bottom in which an absorbent body 20a absorbing excreted urine and the like is arranged. Similar to the tray 20 of the above-described embodiments, the tray 20' has a symmetrical shape in the front-back direction.

The lower container 30' is a box-shaped member having an open upper portion, and is placed being stacked below and attached to the upper container 10'. Therefore, the lower container 30' is also provided in a laterally-elongated rectangular shape when viewed from above. Further, the front wall portion of the lower container 30' is provided with an opening that is for accommodating the tray 20', and the tray 20' can be accommodated through the opening into the inside of the lower container 30'. It should be noted that, since the tray 20' has a symmetrical shape in the front-back direction as described above, the tray 20' can be accommodated in the lower container 30' with the front-back direction of the tray 20' reversed. The accommodation position of the tray 20' in the lower container 30 (the arrangement position of the absorbent body 20a) corresponds to the urine passage portion 100' of the upper container 10, and is located eccentric to the right side with respect to the longitudinal (lateral) center of the lower container 30 (see FIG. 14).

The cover 40' includes: a front wall portion 43' and a back wall portion 44' that are arranged extending along the lateral direction and form the long side of the rectangular shape; and left and right side wall portions 42' that are arranged extending along the front-back direction and form the short side of the rectangular shape. Then, as in FIG. 12, when the cover 40' is attached to the upper portion of the upper container 10', the wall portions (the side wall portions 42', the front wall portion 43', and the back wall portion 44') are upright in the height direction from the periphery of the upper container 10', and the four sides of the animal litter box 1' are in a state of being surrounded by the wall portions. Accordingly, a space for an animal such as a cat to actually perform excretion is formed. Further, the cover 40' has a notch in at least one of the wall portions located on four sides, which serves as an entrance when an animal enters and leaves. In one or more embodiments, a notch portion 46 is formed in a part of the front wall portion 43', and this allows an animal such as a cat to enter and leave the internal space of the animal litter box 1' through the notch portion 46.

Since the ventilator 50 has the same configuration as that of the first example, the description thereof is omitted. That is, the ventilator 50 includes a fan 52, a filter group 53, and the like. Further, the ventilator 50 is provided in the lower container 30', and discharges (exhausts) air in the animal litter box 1' (lower container 30') to the outside. Accordingly, the unpleasant odor can be efficiently removed.

It should be noted that the placement location (the position of the lower container 30') of the ventilator 50 may be any of R1 to R11 shown in FIG. 14, but a location excluding R2 and R9 is preferable (because there is a risk of interference with the handle in R2 and R9). More preferably, the placement location may be a location excluding R7, R8, R10, and R11 (because R7, R8, R10, and R11 are distant from the absorbent body 20*a* or the urine passage portion 100'). R4, R5, and R6 are still more preferable, and R1 and R3 are the most preferable (present example). In R1 and R3, the fan 52 can be arranged close to the absorbent body 20*a* and diagonal to the absorbent body 20*a*, and therefore the ventilation efficiency can be increased. Further, the ventilator 50 may be provided at a plurality of positions (for example, R1 and R3) among R1 to R11 shown in FIG. 14.

Further, in one or more embodiments, the ventilator 50 (the fan 52, the filter group 53, and the like) is provided outside of the lower container 30', but may be provided inside the lower container 30', as in the second example.

Other Examples

Although the above embodiments of the present invention have been described, but the above-described embodiments are intended to facilitate the understanding of the present invention and are not intended to limit the interpretation of the present invention. In addition, the present invention can be modified or improved within the scope of the gist of the present invention, and it is needless to say that equivalents thereof are included in the present invention. For example, modifications which will be described below are possible.

In the first example and the second example, the fan 52 and the filter group 53 are provided on the back wall portion 34 of the lower container 30, but may be provided on any of the left and right wall portions 32. That is, it is sufficient that the fan and the filter group are provided on any wall portion other than the front wall portion 33. Also in this case, the fan and the filter group may be provided on the outer side or on the inner side of the side wall portion 32. Further, it is desirable that the rotation shaft 52*a* of the fan 52 extends along a direction (oblique direction) that rises upward in the vertical direction as it goes inward from the outward side along the rotation shaft 52*a*. Accordingly, the ventilation efficiency can be enhanced by obliquely arranging the fan 52. It should be noted that as in the modified example of the first example, the fan 52 may be arranged perpendicular to the horizontal plane. Further, since the gap G is formed on the front side of the lower container 30, air is likely to flow from the gap G to the fan 52. Therefore, the air flow can be enhanced. Further, enhancing the air flow makes it possible to dry the wet absorbent body 20*a* and excrement treating material S. Thus, the humidity is lowered, makes it possible to suppress the generation of odor-causing bacteria. Further, by evaporation of urine accumulated in the absorbent body 20*a*, the absorption capacity of the absorbent body 20*a* can be restored. Further, since the feces in the upper layer (upper container 10) and the excrement treating material S to which the feces is attached are dried, the cause of odor is likely to be removed.

In addition, in the above-described embodiments, three filters (the deodorization filter 53*a*, the litter-preventing filter 53*b*, and the water-repellent filter 53*c*) of the filter group 53 of the ventilator 50 are provided on the inner side with respect to the fan 52, but the configuration is not limited thereto. For example, the deodorization filter 53*a* may be arranged on the outer side (in the case of FIG. 7, the back side) with respect to the fan 52. Also in this case, the unpleasant odor component of the animal litter box 1 can be adsorbed by the deodorization filter 53*a*, and the unpleasant odor can be prevented from diffusing to the outside (living space). Further, in the above-described embodiments, the filter group 53 is configured to have three layers. However, the configuration is not limited thereto, and the filter group 53 may have four or more layers or two or less layers. For example, in the case where the filter group has two layers, a configuration is acceptable in which the water-repellent filter 53*c* is not provided by employing a water-repellent filter having water repellency as the litter-preventing filter 53*b*. Alternatively, a configuration is acceptable in which only the water-repellent filter 53*c* and the deodorization filter 53*a* is provided without the litter-preventing filter 53*b*. In addition, the deodorization filter 53*a* may have two layers. It should be noted that it is desirable that the filters excluding the deodorization filter 53*a* are arranged on the inner side with respect to the fan 52.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATION OF REFERENCES

1, 1': animal litter box,
10, 10': upper container, 12: bottom portion, 12*a*: hole,
13: outer peripheral portion, 14: side portion, 15: folded-back portion,
20, 20': tray, 20*a*: absorbent body, 21: bottom portion, 22: side portion,
23: absorbent-body placement portion, 24: handle portion,
30, 30': lower container, 31: bottom portion, 31*a*: bottom opening portion (opening portion),
32: side wall portion, 33: front wall portion (front surface),
33*a*: attach/detach opening portion,
33*b*: recessed portion, 34: back wall portion (back surface),
34*a*, 34*a'*: back wall opening portion,
35: folded-back portion, 36: accommodation space, 37: leg portion,
38: housing portion, 38*a*: housing bottom portion,
38*b*: housing front wall portion, 38*c*: housing opening portion,
40, 40': cover, 41: opening portion, 42, 42': side wall portion,
43, 43': front wall portion, 44, 44': back wall portion,
45: overhanging portion, 46: notch portion,
50: ventilator, 51: cover member, 51*a*: discharge port, 51*b*: vent hole,
52: fan (ventilation fan), 52*a*: rotation shaft, 52*b*: wing,
53: filter group, 53*a*: deodorization filter,
53*b*: litter-preventing filter, 53*c*: water-repellent filter,
54: power supply unit, 55: driving unit, 56: control unit,
57: detection unit, 58: communication unit, 59: notification unit,
100, 100': urine passage portion (liquid passage portion),
110: cross rib, 110*a*: front cross rib, 110*b*: back cross rib,
110H: uppermost portion, 110L: lowermost portion, 111: first upper curved surface, 111a: upper inclined surface,
112: first lower curved surface, 112a: lower inclined surface,
113a, 113b: front curved surface, 114a, 114b: back curved surface,
120: longitudinal rib, 120a: left longitudinal rib, 120b: right longitudinal rib,
120H: uppermost portion, 120L: lowermost portion,
121: second upper curved surface, 122: second lower curved surface,
240: hooking hole,
351: protrusion, 352: fitting piece, 352a: protruding portion,
G: gap, S: excrement treating material

What is claimed is:

1. An animal litter box comprising:
an upper container comprising a liquid passage portion having holes through which urine passes downward;
a tray on which an absorbent body is disposed to absorb the urine that passes through the liquid passage portion;
a lower container that supports the upper container from below and that detachably accommodates the tray; and
a ventilation fan disposed in the lower container and that sends internal air in the lower container outside, wherein
the lower container has an inclined back wall inclined obliquely with respect to a vertical direction of the animal litter box, and
the ventilation fan is disposed in the inclined back wall in parallel with the vertical direction.

2. The animal litter box according to claim 1, wherein at least a part of the ventilation fan is disposed below a lower surface of the liquid passage portion.

3. The animal litter box according to claim 1, wherein the ventilation fan rotates around a rotation shaft, and
the rotation shaft is disposed below a lower surface of the liquid passage portion.

4. The animal litter box according to claim 1, wherein
an attach/detach opening portion is disposed on a front surface of the lower container to attach and detach the tray, and
in a state where the lower container accommodates the tray, a gap is formed between the tray and an edge of the attach/detach opening portion.

5. The animal litter box according to claim 1, wherein
an opening portion is disposed in a bottom portion of the lower container, and
an uneven portion is disposed on a lower surface of the bottom portion.

6. The animal litter box according to claim 1 further comprising:
a deodorization filter including a deodorant and disposed on an inner side or an outer side with respect to the ventilation fan.

7. The animal litter box according to claim 6 further comprising:
a litter-preventing filter that is:
disposed on an inner side with respect to the deodorization filter and the ventilation fan, and
coarser than the deodorization filter.

8. The animal litter box according to claim 6 further comprising:
a water-repellent filter disposed on an inner side with respect to the deodorization filter and the ventilation fan.

9. The animal litter box according to claim 1, wherein the ventilation fan is detachably disposed in the lower container.

* * * * *